US011003832B2

(12) United States Patent
Harley et al.

(10) Patent No.: US 11,003,832 B2
(45) Date of Patent: May 11, 2021

(54) EMBEDDED ACTION CARD IN EDITABLE ELECTRONIC DOCUMENT

(71) Applicant: Microsoft Technology Licensing, LLC, Redmond, WA (US)

(72) Inventors: Catherine Anne Harley, Seattle, WA (US); Yibing Zhu, Woodinville, WA (US); Ivan Obraztsov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/890,906

(22) Filed: Feb. 7, 2018

(65) Prior Publication Data

US 2019/0243879 A1 Aug. 8, 2019

(51) Int. Cl.

*G06F 17/00* (2019.01)
*G06F 40/134* (2020.01)
*G06F 3/0484* (2013.01)
*G06F 40/166* (2020.01)

(52) U.S. Cl.

CPC ........ *G06F 40/134* (2020.01); *G06F 3/04842* (2013.01); *G06F 40/166* (2020.01)

(58) Field of Classification Search

CPC .... G06F 17/211; G06F 9/451; G06F 3/04842; G06Q 30/04

See application file for complete search history.

(56) References Cited

U.S. PATENT DOCUMENTS

| | | | | |
|---|---|---|---|---|
| 9,747,621 | B1 * | 8/2017 | Kuruvila | G06Q 30/04 |
| 2002/0065849 | A1 * | 5/2002 | Ferguson | H04L 29/06 715/205 |
| 2005/0044496 | A1 * | 2/2005 | Kotler | G06F 17/211 715/225 |
| 2008/0177656 | A1 * | 7/2008 | Sun | G06Q 20/02 705/39 |
| 2011/0085211 | A1 * | 4/2011 | King | G06F 16/951 358/474 |
| 2011/0307771 | A1 | 12/2011 | Lok | |
| 2012/0304046 | A1 * | 11/2012 | Neill | G06F 16/50 715/209 |
| 2013/0174014 | A1 * | 7/2013 | Kwan | G06F 8/36 715/234 |

(Continued)

OTHER PUBLICATIONS

Bier, Eric A., "Embedded Buttons", In Journal of ACM Transactions on Information Systems vol. 10, Issue 4, Oct. 1992, Oct. 1, 1992, pp. 381-407.

(Continued)

*Primary Examiner* — Scott T Baderman
*Assistant Examiner* — Barbara M Level
(74) *Attorney, Agent, or Firm* — Rainier Patents, P.S.

(57) ABSTRACT

Described herein are systems and methods for utilizing an embedded action card in an electronic document editable using an application. The action card comprises code that facilitates communication with an associated service, the associated service can be local to a computer executing the application or on a remote computer. The action card can provide a user with real-time information received from the associated service. The action card can receive information from the user which the action card provides to the associated service.

20 Claims, 46 Drawing Sheets

(56) References Cited

U.S. PATENT DOCUMENTS

| | | | | |
|---|---|---|---|---|
| 2014/0164890 | A1* | 6/2014 | Fox | G06F 40/131 715/202 |
| 2014/0173426 | A1* | 6/2014 | Huang | G06F 17/24 715/256 |
| 2015/0254216 | A1* | 9/2015 | DeLuca | G06F 17/2235 715/206 |
| 2016/0132291 | A1* | 5/2016 | Bai | G06F 3/167 715/728 |
| 2017/0147547 | A1 | 5/2017 | Desai et al. | |
| 2017/0262294 | A1* | 9/2017 | Yakan | H04L 63/102 |
| 2017/0353466 | A1 | 12/2017 | Weaver et al. | |
| 2018/0174229 | A1* | 6/2018 | Sherwin | G06Q 30/0643 |
| 2018/0189250 | A1* | 7/2018 | Lee | G06Q 10/101 |
| 2019/0243515 | A1* | 8/2019 | Harley | G06F 40/117 |

OTHER PUBLICATIONS

"International Search Report and Written Opinion Issued in PCT Application No. PCT/US2019/013890", dated Apr. 11, 2019, 13 Pages.

* cited by examiner

FIG. 19
1900
410
120
Welcome to Contoso
Hello, Nico.
Welcome to your new office at Contoso! We're so glad you're here. Here are some guides for your first day.
1. Attend the NEO training
2. Join your team's working group.
3. Select your devices.
Join
Join
1910
1920
1930

EMBEDDED ACTION CARD IN EDITABLE ELECTRONIC DOCUMENT

BACKGROUND

Word processing, spreadsheet, database, slide presentation, electronic mail, drawing, note taking, web browser, media player, and game applications allow users to view, create, and/or edit documents. However, as information relevant to a document changes, the document conventionally is required to be manually updated with corresponding information in order to remain current and relevant. Further, a user is generally not able to update information external to the document from within the document.

SUMMARY

Described herein is a system for utilizing an action card, comprising: a computer comprising a processor and a memory having computer-executable instructions stored thereupon which, when executed by the processor, cause the computing device to: during editing of an electronic document using an application, receive a user selection of an action card; in response to the user selection, embed an instance of the action card into the electronic document, the instance of the action card comprising code to communicate with a service external to the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
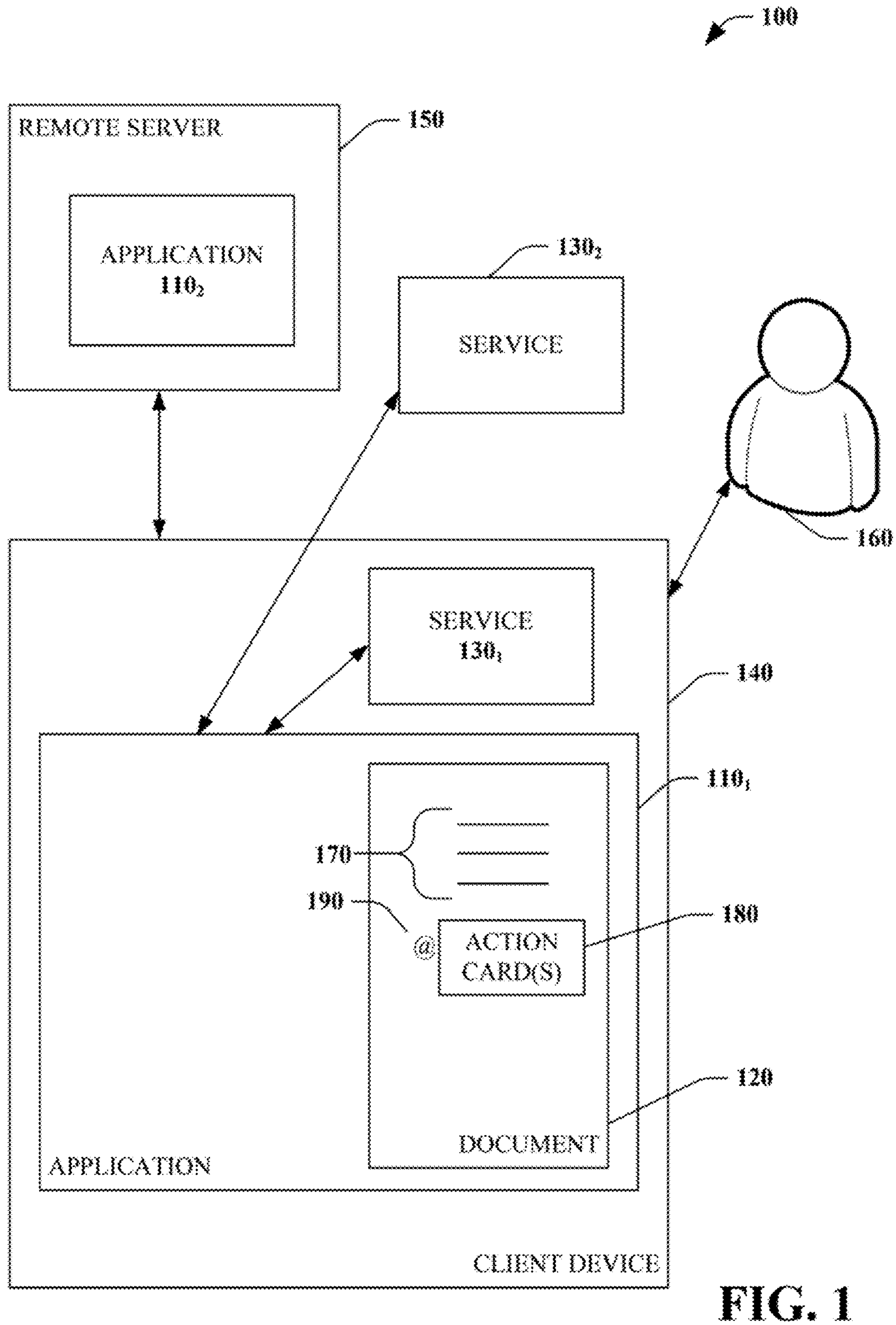
FIG. 1 is a functional block diagram that illustrates a system for utilizing an action card in a document.

Various technologies pertaining to embedded action card(s) in electronic document(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding embedded action card(s) in electronic document(s). What follows are one or more exemplary systems and methods.

Aspects of the subject disclosure pertain to the technical problem of obtaining and/or providing information to service(s) external to an application while editing/viewing an electronic document with the application. The technical features associated with addressing this problem involve during editing of an electronic document using an application, receiving a user selection of an action card. In response to the user selection, an instance of the action card is embedded into the electronic document, the instance of the action card comprising code to communicate with a service external to the application (e.g., in real-time). During viewing of the electronic document, a user selection of the instance of the action card embedded in the electronic document can be received. In response to the user selection, a user interface associated with the embedded instance of the action card can be displayed (e.g., to provide and/or receive information in real-time). Accordingly, aspects of these technical features exhibit technical effects of more efficiently and effectively increasing user efficiency and/or reducing network bandwidth, as users can obtain information in a more efficient manner.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for utilizing an action card in a document 100 is illustrated. The system 100 includes an application $\mathbf{110}_1$, $\mathbf{110}_2$ (generally, 110) used to view, generate, and/or edit an electronic document 120. Examples of suitable applications 110 include, but are not limited to, word processing, spreadsheet, database, slide presentation, electronic mail, drawing, note taking, web browser, media player, and game applications.

The system 100 can facilitate a user's interaction with one or more services 130 using an action card without exiting the application 110, minimizing the application 110, and/or leaving a document canvas of an electronic document 120 associated with the application 110. In some embodiments, the user can update data in one or more services 130 using the action card. The updated data in reflected in the one or more services 130 external to the application 110 and in an instance of the action card embedded in the electronic document 120. In some embodiments, updated data from one or more service 130 is provided to the user via the instance of the action card embedded in the electronic document 120.

In some embodiments, the application $\mathbf{110}_1$ is a thick client application stored locally on a client device 140. In some embodiments, the application $\mathbf{110}_2$ is thin client application (i.e., web applications) that resides on a remote service 150 and accessible over a network or combination of networks (e.g., the Internet, wide area networks, local area networks). A thin client application $\mathbf{110}_2$ can be hosted in a browser-controlled environment or coded in a browser-supported language and reliant on a common web browser to render the application executable on the client device 140.

A user 160 can use the application 110 to create a new document 120, edit an existing document 120, and/or view an existing document 120. The application 110 receives input from the user 160, for example, text input, from one or more input devices including, for example, a keyboard, a computer mouse, a remote control. In some embodiments, the application 110 receives input from the user 160 through a Natural User Interface (NUI) which enables the user to interact with the client device 140 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in content 170 being added to the document 120. In some embodiments, content 170 is added within a document canvas (e.g., a page in a word processing document, a spreadsheet in a spreadsheet document, a slide in a presentation document) of the document 120.

During editing of the document 150 using the application 110, a user selection of an action card 180 can be received. In some embodiments, user selection is based upon receipt of a trigger entry 190 during editing of the document 120. The application 110 can monitor a user's interaction with the document 120 to determine when a trigger entry 190 has been received.

In some embodiments, the trigger entry 190 corresponds to an inline command to provide information regarding one or more services 130 without exiting the application 110, minimizing the application 110, and/or leaving a document canvas of the document 120 associated with the application 110. In some embodiments, the trigger entry 190 is "@". Upon receiving the "@", the application 110 can determine that a trigger entry 190 has been received. The trigger entry 190 of "@" is just one example, and other character(s), symbol(s), and/or sequence(s) of character(s) and/or symbol(s) can be used as trigger entry(ies). 180.

Responsive to receipt of the trigger entry 190, the application 110 can provide information regarding one or more action cards 190 associated with one or more services 130 available to the user 160. In some embodiments, the information is provided to the user 160 via a display. In some embodiments, the information is provided to the user 160 via a speaker of the client device 140.

In some embodiments, one or more of the services 130 are local to the client device 140. In some embodiments, one or more of the services 130 are hosted remotely and accessible to the client device 140, for example, via the Internet, a wide area network, and/or a local area networks. In some embodiments, one or more of the services 130 comprise a bot assistant.

In some embodiments, the information provided regarding action cards 190 associated with the one or more services 130 can be determined by the application 110 based upon a context associated with the document 120. For example, the application 110 can determine the context based upon content of the document 120, a file name associated with the document 120, metadata associated with the document 120, and the like.

In some embodiments, the information regarding action cards 190 provided regarding the one or more services 130 can be determined based upon stored historical usage of a particular user 160 of the application 110. For example, service(s) 130 which the particular user 160 has used can be ranked and presented in an ordered list of descending usage.

In some embodiments, the trigger entry 190 can be accompanied by one or more additional character(s) and/or symbol(s) which the application 110 can utilize to determine the action cards 190 to include regarding the one or more services 130.

In some embodiments, the action cards 190 provided regarding one or more services 130 can be an intelligent list. The intelligent list can be populated with action cards 190 for services 130 based upon historical usage of a particular user, historical usage of a plurality of users (e.g., provided to the application 110 in a privacy-preserving manner), and/or a context of the document 120 determined by the application.

In some embodiments, a quantity of action cards 190 provided regarding the one or more services 130 can be predetermined. In some embodiments, a quantity of action cards 190 provided regarding the one or more services 130 can be determined dynamically, for example, based upon a context of the document 120, and/or historical information regarding service usage by a particular user 160.

The application 110 can receive a user selection of a particular action card 180 regarding the one or more services 130 provided (e.g., displayed). In response to the user selection, the application can embed an instance of the particular action card 180 into the document 120. Once the instance of the action card 180 has been embedded into the document 120 (e.g., and the document 120 saved), the instance of the action card 180 is available for use by user(s) 160 viewing and/or editing the document 120.

In some embodiments, the instance of the action card 180 provides a visible input and/or output area. In some embodiments, the instance of the action card 180 is visible as minimized text within the document 120. Activation of the minimized text can cause an input and/or output area to be displayed. In some embodiments, the instance of the action card 180 is visible as a symbol and/or an icon, for example, that provides a hint as to functionality associated with the instance of the action card 180. Activation of the symbol and/or icon can cause an input and/or output area to be displayed.

In some embodiments, embedding an instance of the particular action card 180 into the document 120 includes inserting code that facilitates communication of information from a particular service 130 associated with the particular action card 180 to the application 110 (e.g., real-time information). In some embodiments, embedding an instance of the particular action card 180 into the document 120 includes inserting code that facilitates communication to a particular service 130 associated with the particular action card 180 from the application 110 (e.g., real-time information). In some embodiments, the instance of the particular action card 180 can further include embedded information regarding zero, one or more parameter(s) for use with the particular service 130.

In some embodiments, an action card 180 defines a graphical user interface for providing information to the user 160 and/or for reviewing information from the user 160. For example, action cards 180 can be designed/created by developers for end-users to embedded within documents 120. In some embodiments, the graphical user interface defined by the action card 180 is based upon a React JavaScript library for building user interfaces.

Figure 2:
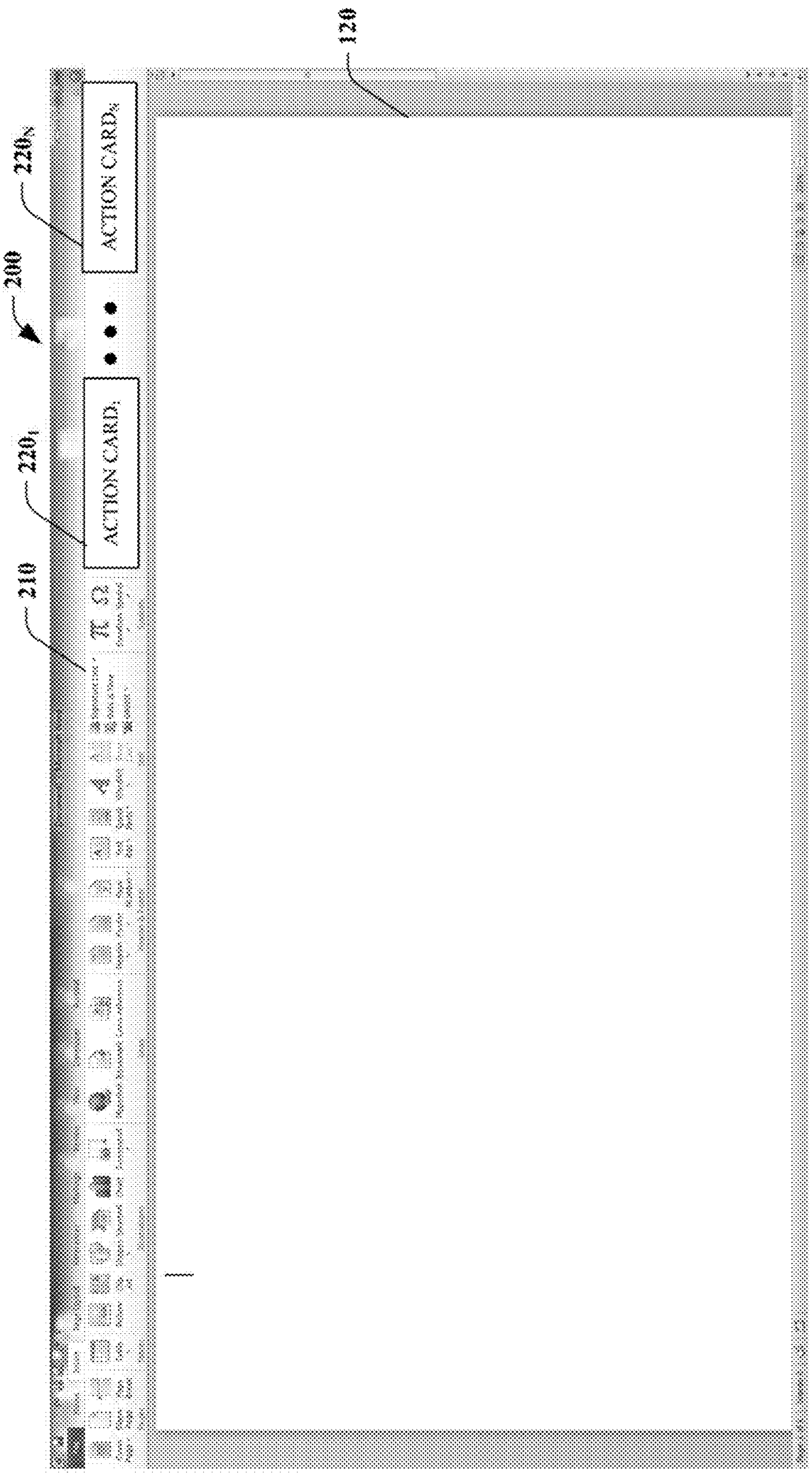
FIGS. 2-42 are diagrams that illustrate exemplary user interfaces.

In some embodiments, user selection of an action card 180 is based upon a user's selection of the action card 180 from a gallery of one or more action cards 190 provided by the application 110, for example, on an insert ribbon of a user interface. FIG. 2 illustrates an exemplary user interface 200 generated by the application 110 and displayed by the client device 140. The user interface 200 includes a ribbon 210 with one or more action cards 220. The action cards 220 can be inserted into the document 120.

Figure 3:
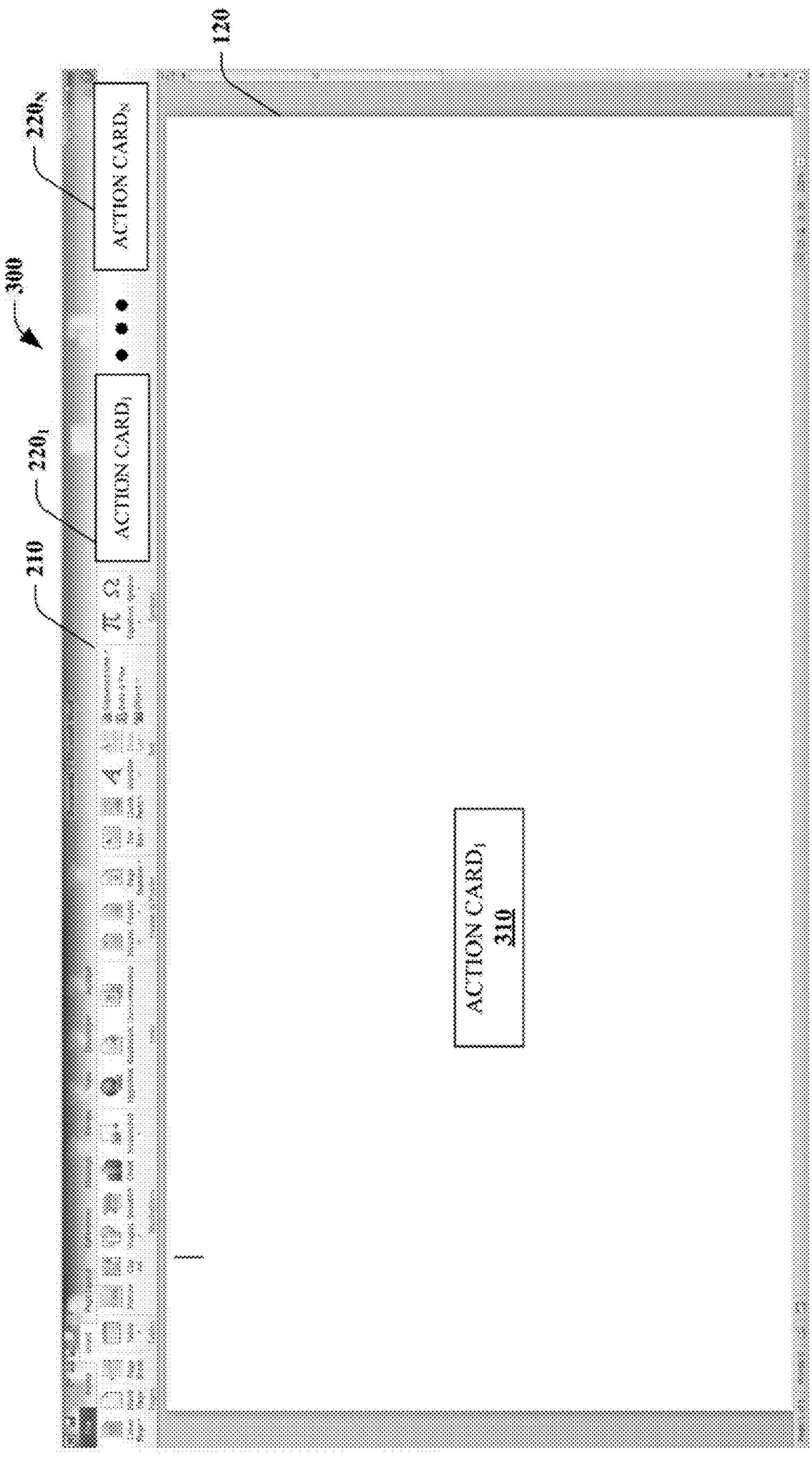

FIG. 3 illustrates an exemplary user interface 300 generated by the application 110 and displayed by the client device 140. In this example, a user 160 has selected a particular action card 310 (e.g., "Action Card$_1$"). In response to this selection, the application 110 has embedded an instance of the action card 310 into the document 120. Embedding an instance of the action card 310 into the document 120 includes inserting code that facilitates communication to and/or from a particular service 130 associated with the particular action card 180 from the application 110 (e.g., real-time information). In some embodiments, the instance of the action card 310 can include one or more fields that allow the service 130 to provide information to the user and/or that allow the user to provide information (e.g., text based information) to the service 130.

Figure 4:
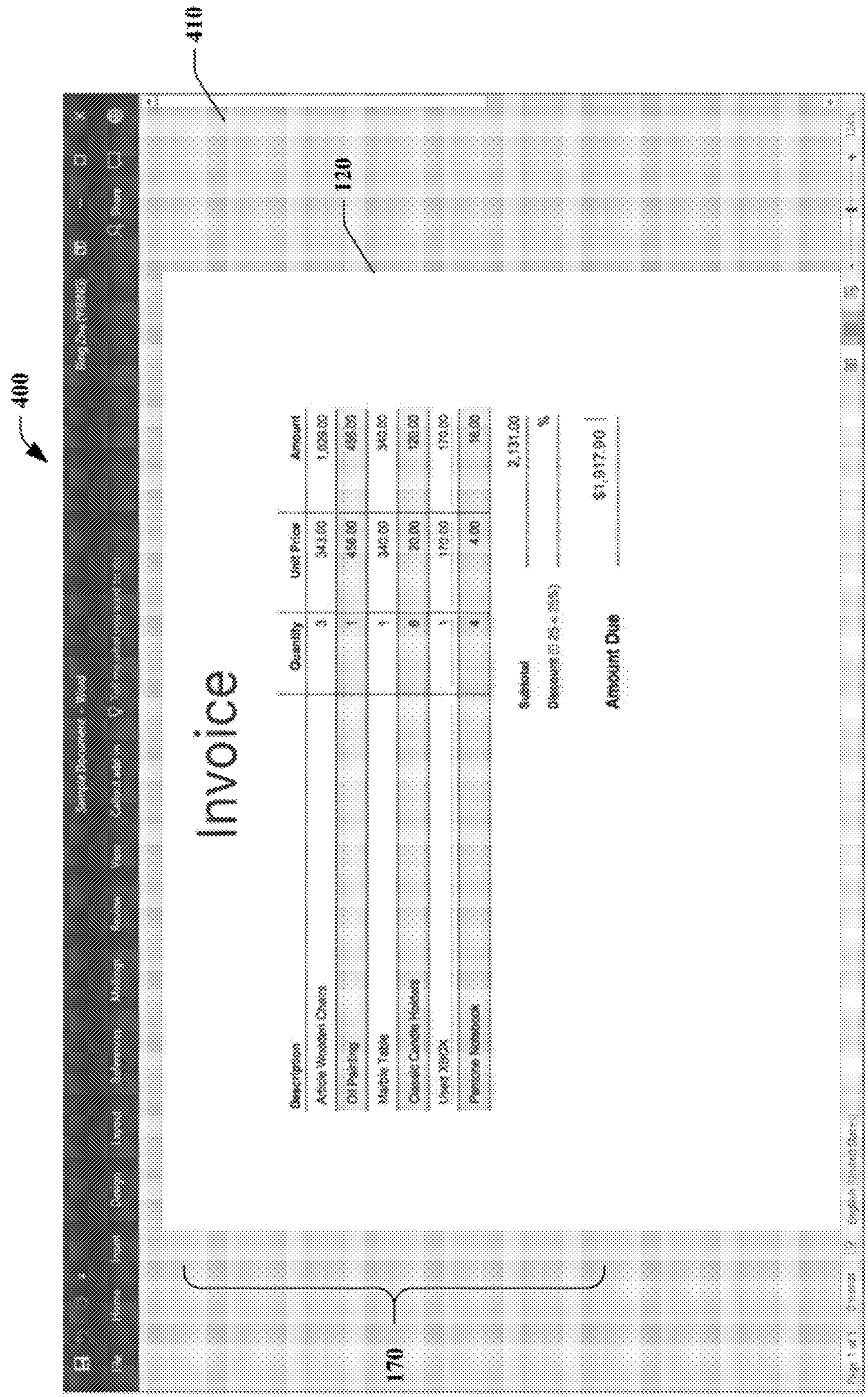

By way of example, and not limitation, FIGS. 4-18 illustrate an exemplary scenario (e.g., workflow) of (1) embedding an action card associated with a pay service in an invoice document and (2) utilizing the embedded action card to facilitate payment of the invoice using the pay service. Turning to FIG. 4, an exemplary user interface 400 generated by the application 110 and displayed by the client device 140 is illustrated. A content display area 410 displays content from the document 120. In the example of FIG. 4, a user 160 has placed the cursor to the right of content 170 "$1,917.90".

Figure 5:
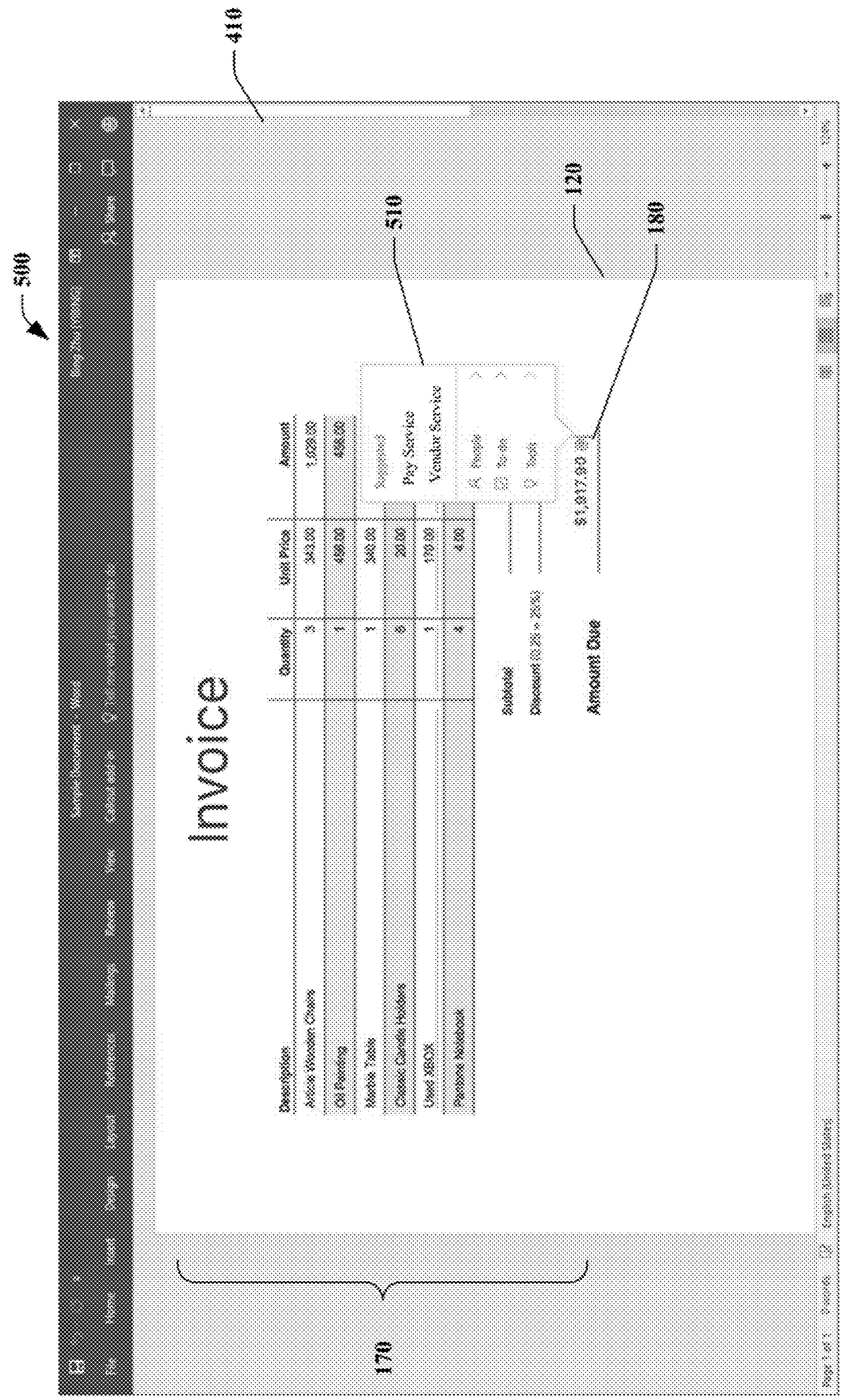

FIG. 5 illustrates an exemplary user interface 500 generated by the application 110 and displayed by the client device 140. In the example of FIG. 5, the user 160 has entered the trigger entry 190 "@". Responsive to receipt of the trigger entry 190, the application 110 has provided action cards 190 regarding services 130 available to the user 160 via a service display area 510.

Figure 6:
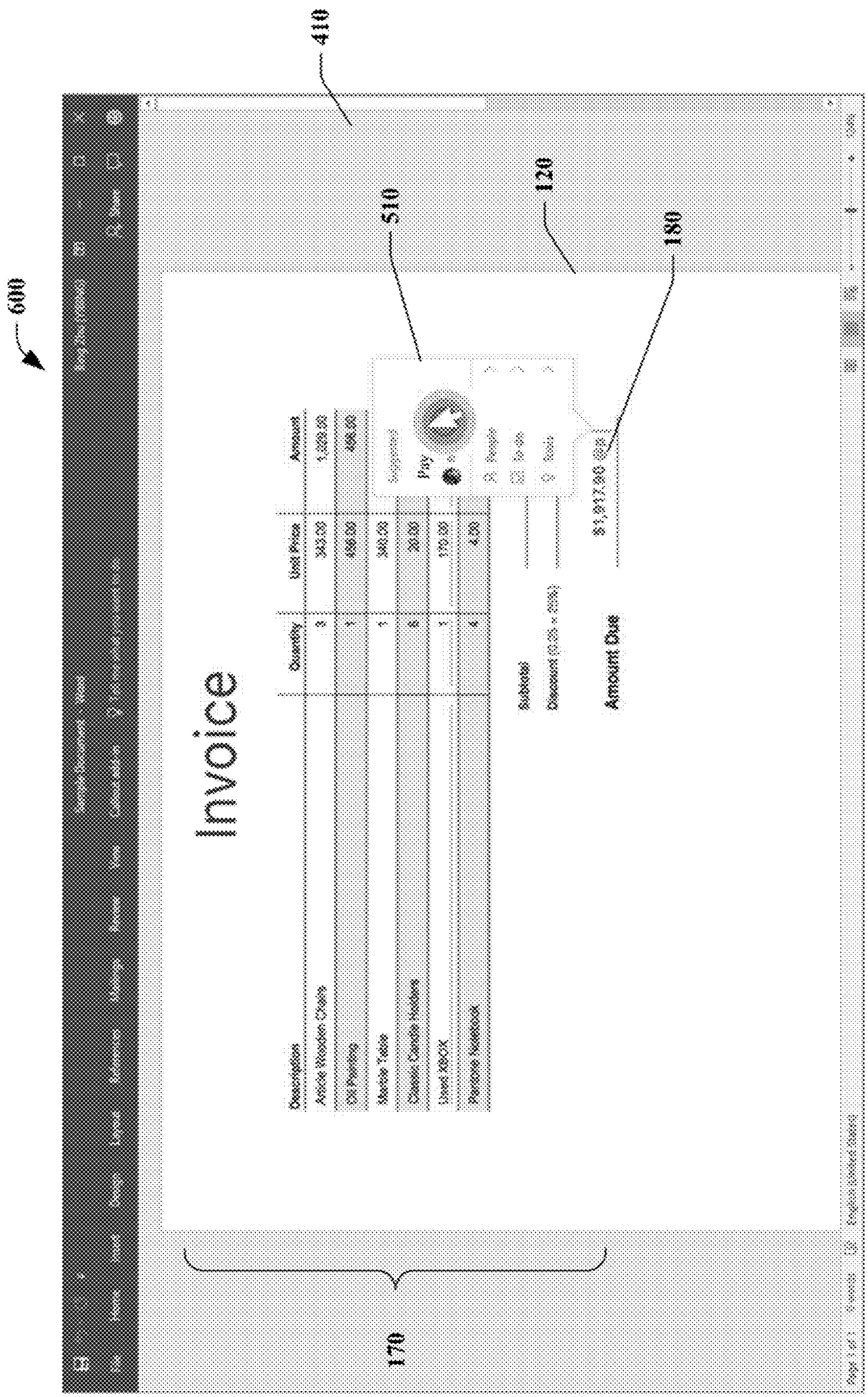

FIG. 6 illustrates an exemplary user interface 600 generated by the application 110 and displayed by the client device 140. In the example of FIG. 6, the user 160 has entered additional content 170 "p". In response to this additional content, the application 110 has provided modified action cards 190 regarding services 130 available to the user 160 via the service display area 510. In this example, "Paul Smith" has been substituted for "Service 4". Further, the user 160 has selected the "Pay Service" action card.

Figure 7:
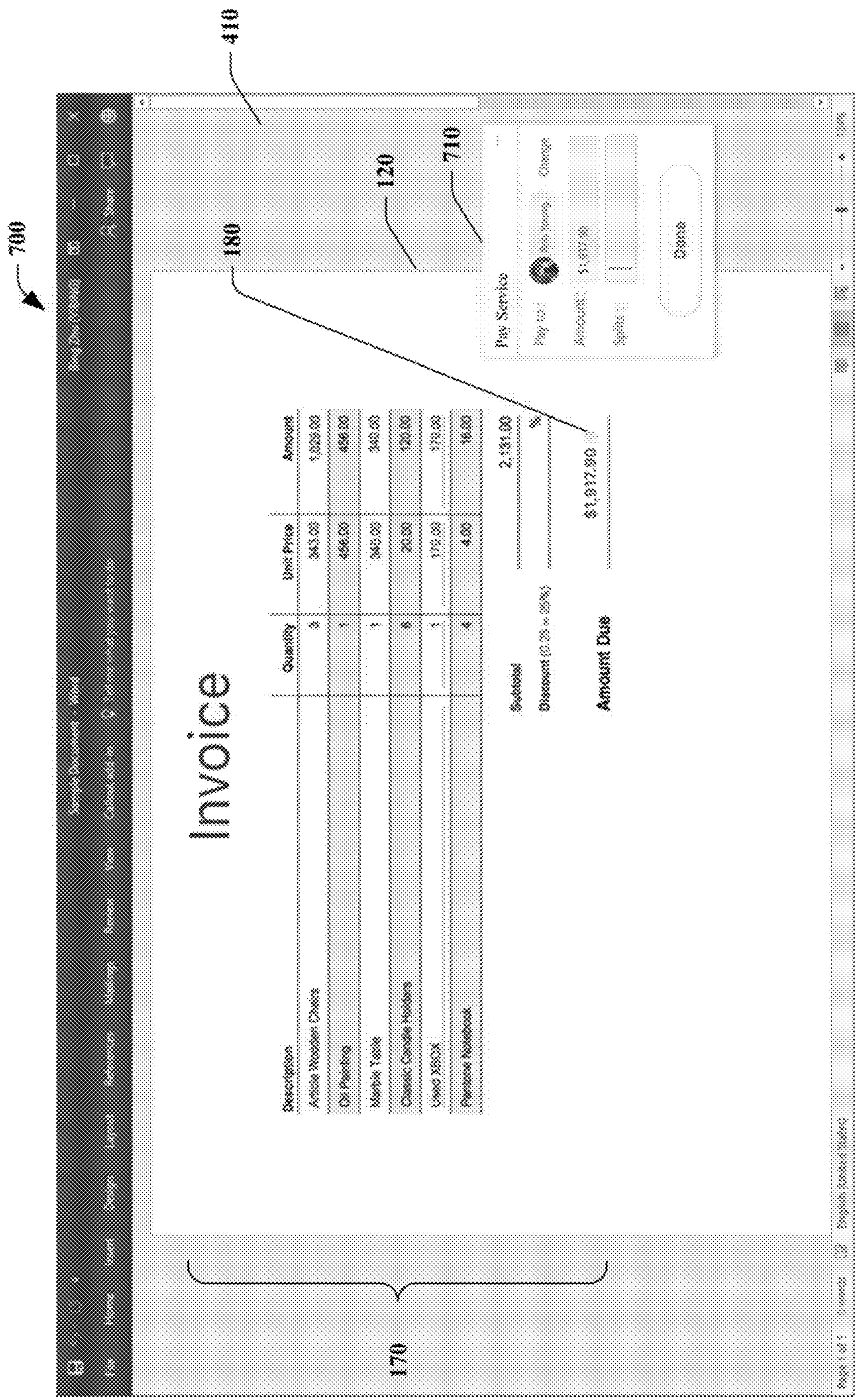

FIG. 7 illustrates an exemplary user interface 700 generated by the application 110 and displayed by the client device 140. In the example of FIG. 7, in response to the user selection of the "Pay Service" action card, the application 110 has inserted an instance of the action card 180, in this example, causing a service input/output area 710 to be displayed.

Figure 8:
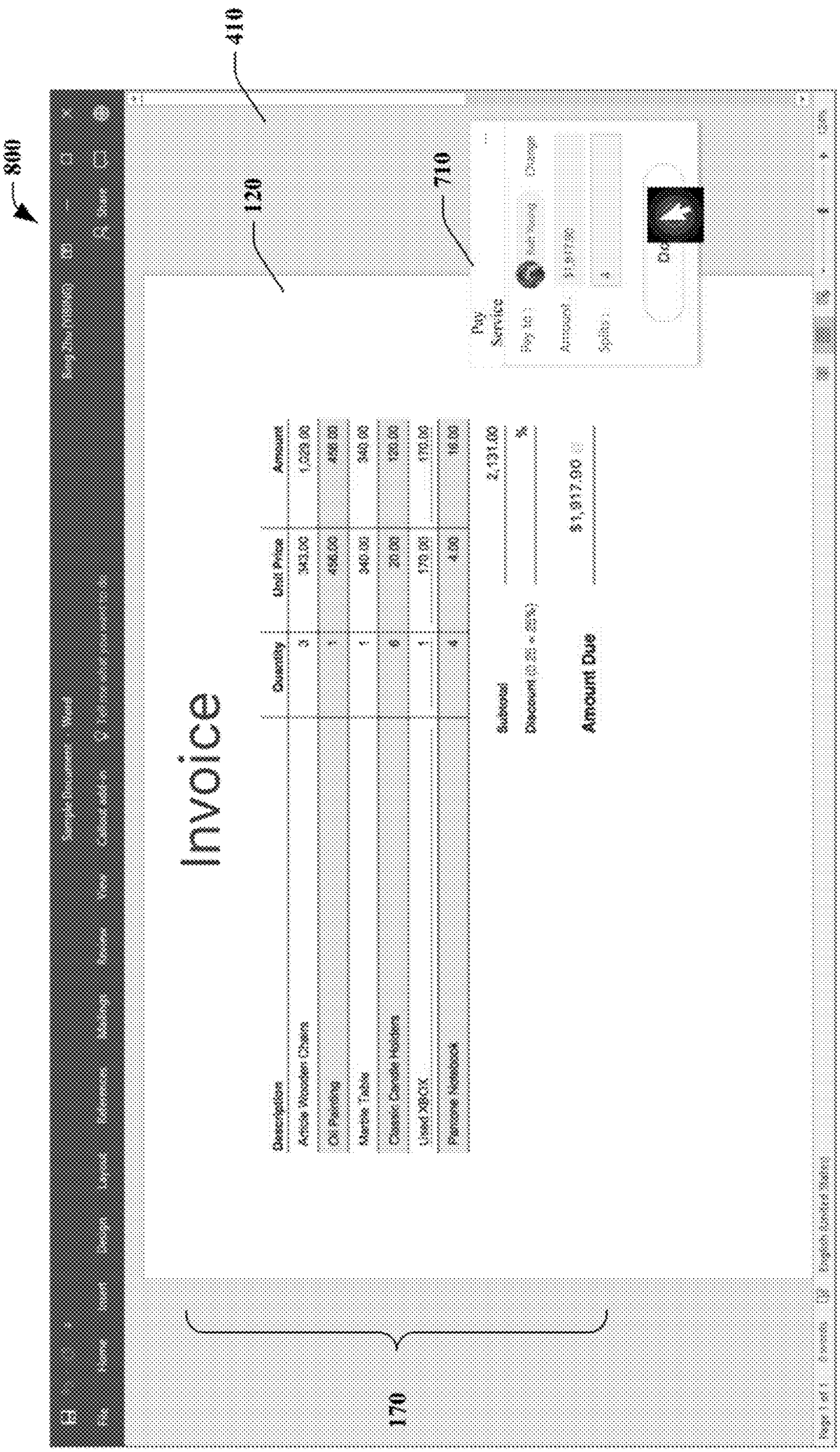

FIG. 8 illustrates an exemplary user interface 800 generated by the application 110 and displayed by the client device 140. In the example of FIG. 8, the user 160 has entered data into the service input/output area 710 and selected "Done".

Figure 9:
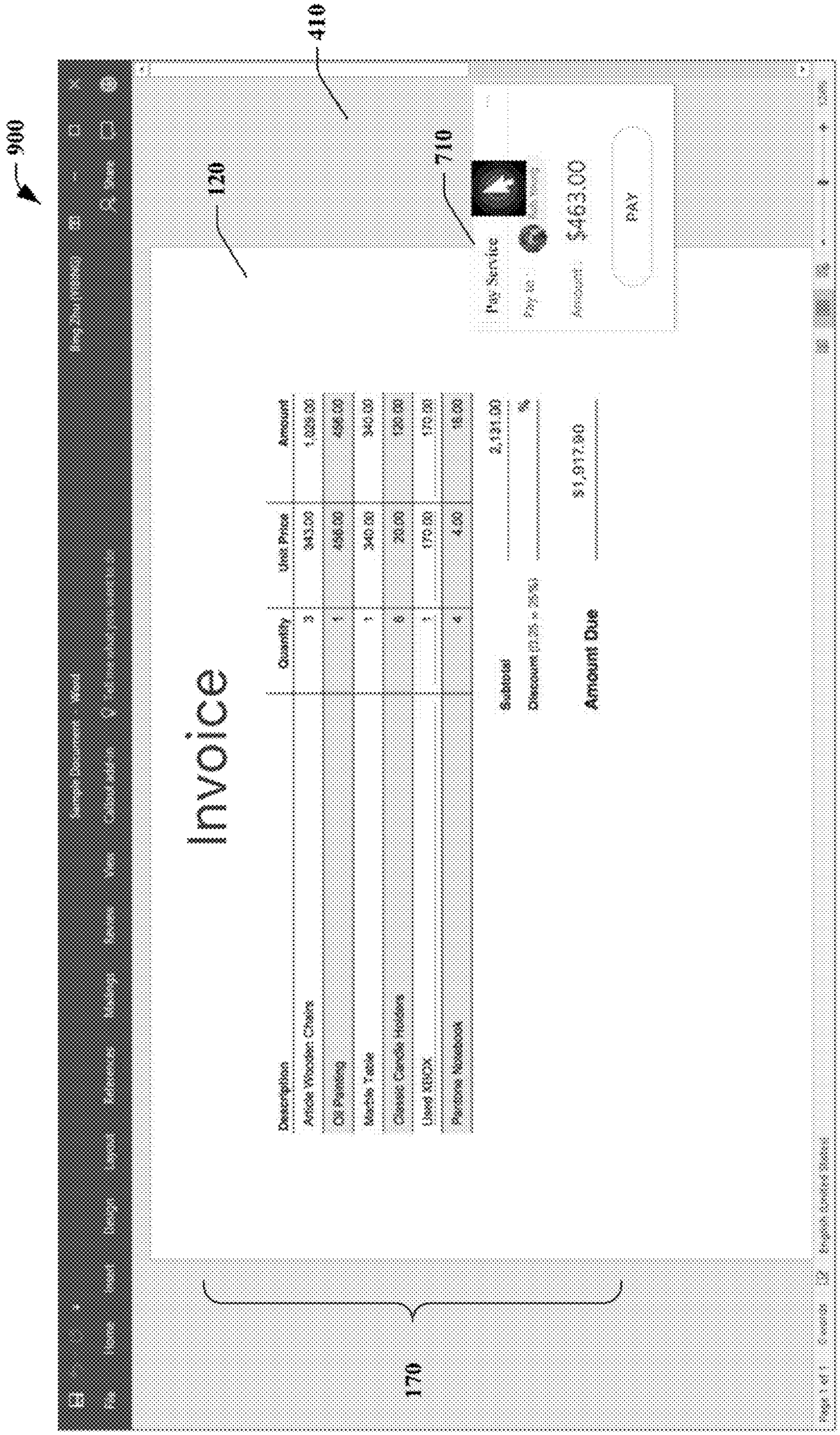

FIG. 9 illustrates an exemplary user interface 900 generated by the application 110 and displayed by the client device 140. In the example of FIG. 9, in response to the user 160 selection of "Done", the service input/output area 710 has been updated to reflect the embedded instance of the action card 180 enabling payment of the invoice.

In some embodiments, the instance of the action card 180 is self-hosted and selectable and shareable independent of the document 120. For example, the document 120 can be provided (e.g., shared, emailed, etc.) to one or more other users.

Figure 10:
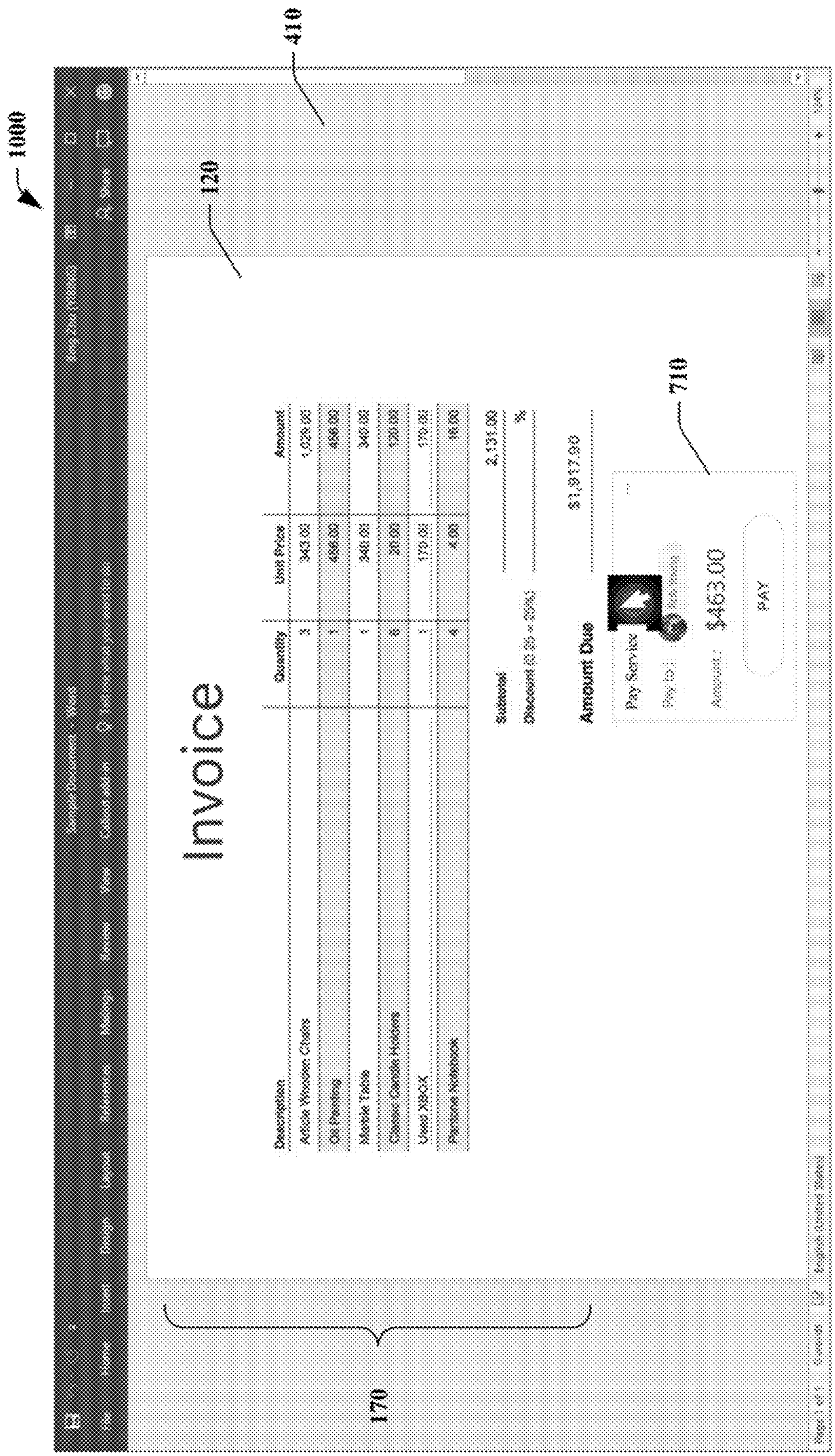

FIG. 10 illustrates an exemplary user interface 1000 generated by the application 110 and displayed by the client device 140. In the example of FIG. 10, another user has received the document 120 with the embedded instance of the action card 180 as displayed in the service input/output area 710.

Figure 11:
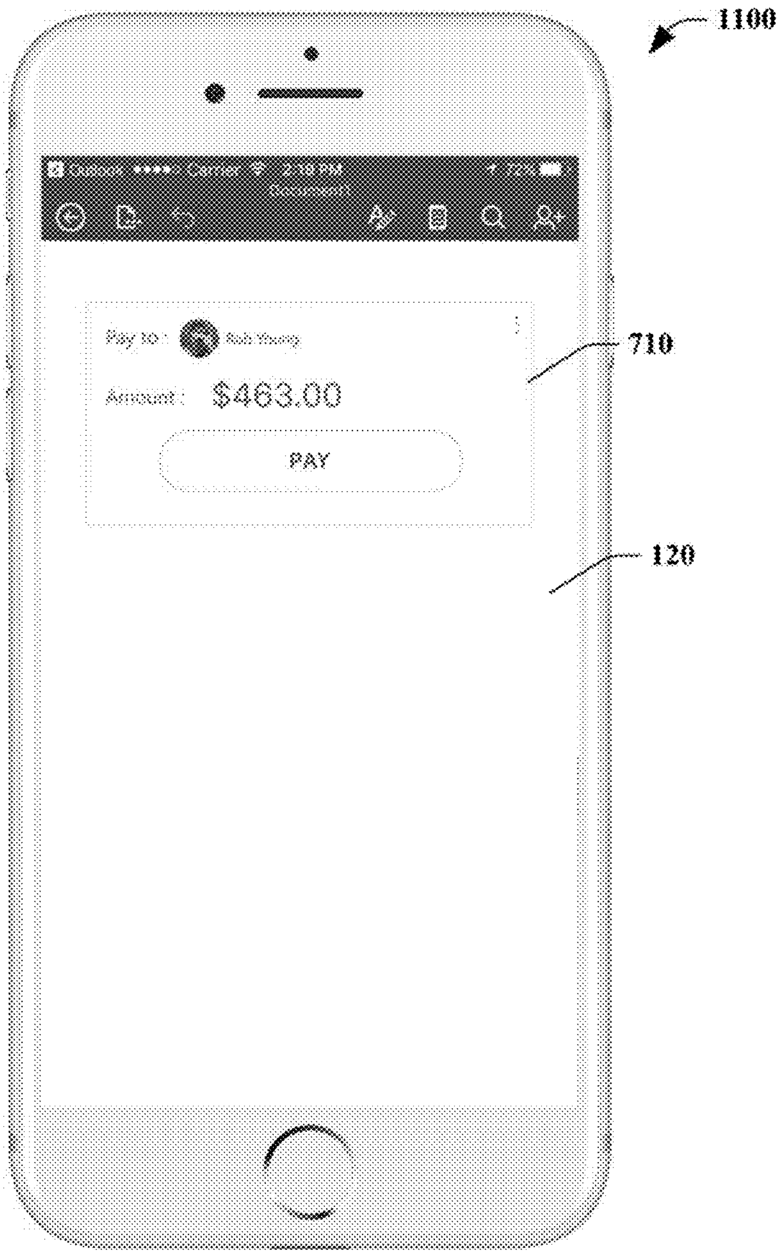

FIG. 11 illustrates an exemplary user interface 1100 generated by the application 110 and displayed by the client device 140. In this example, another user has received the document 120 with the embedded instance of the action card 180 as displayed in the service input/output area 710. In the example of FIG. 11, the client device is a mobile phone. In the example of FIG. 11, the another user has scrolled the document 120 such that substantially only the service input/output area 710 is visible in the document 120 (e.g., display of document 120 optimized for the particular client device 140).

Figure 12:
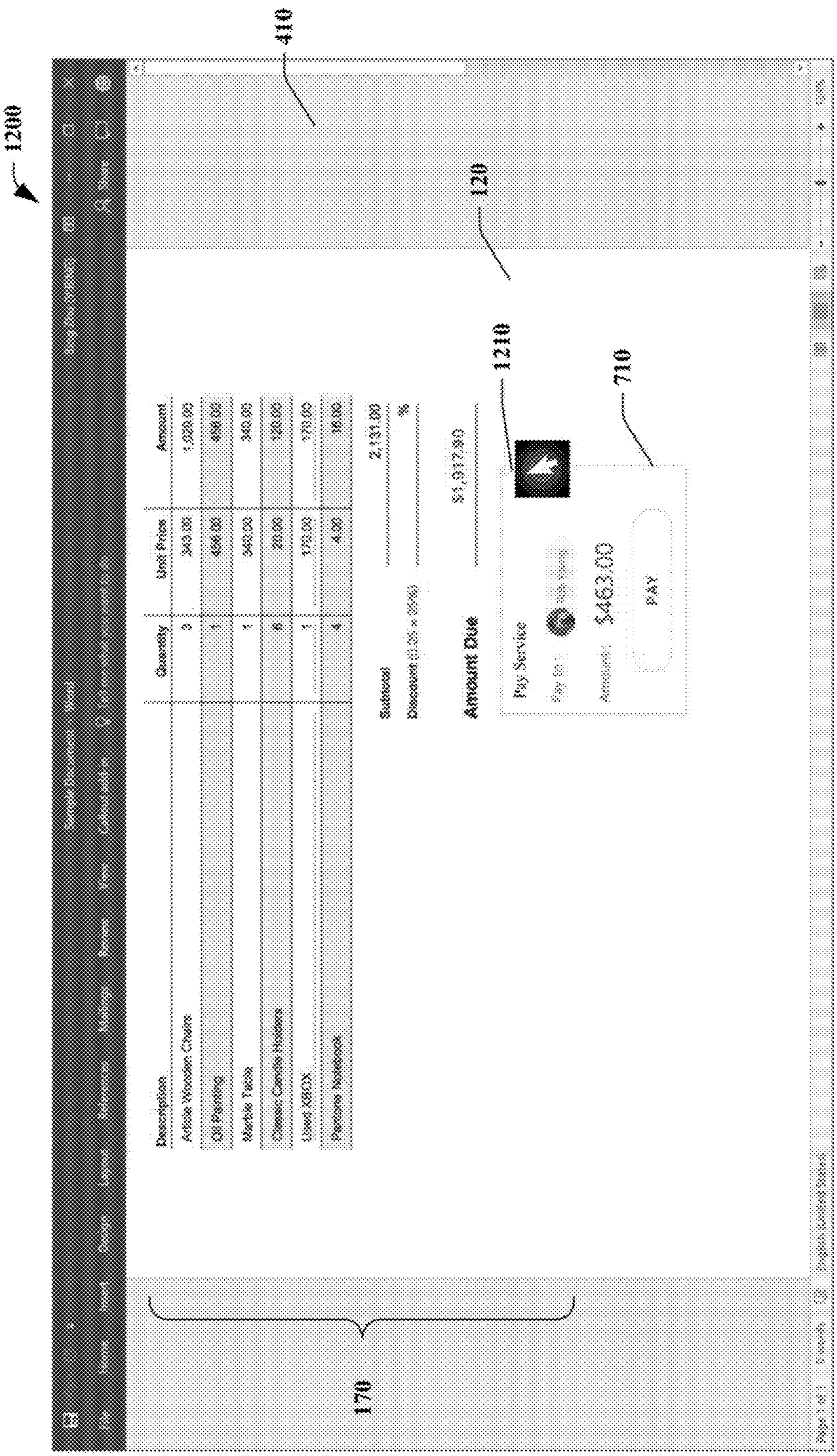

FIG. 12 illustrates an exemplary user interface 1200 generated by the application 110 and displayed by the client device 140. In this example, a user 160 has selected a more options selection 1210 of the service input/output area 710.

Figure 13:
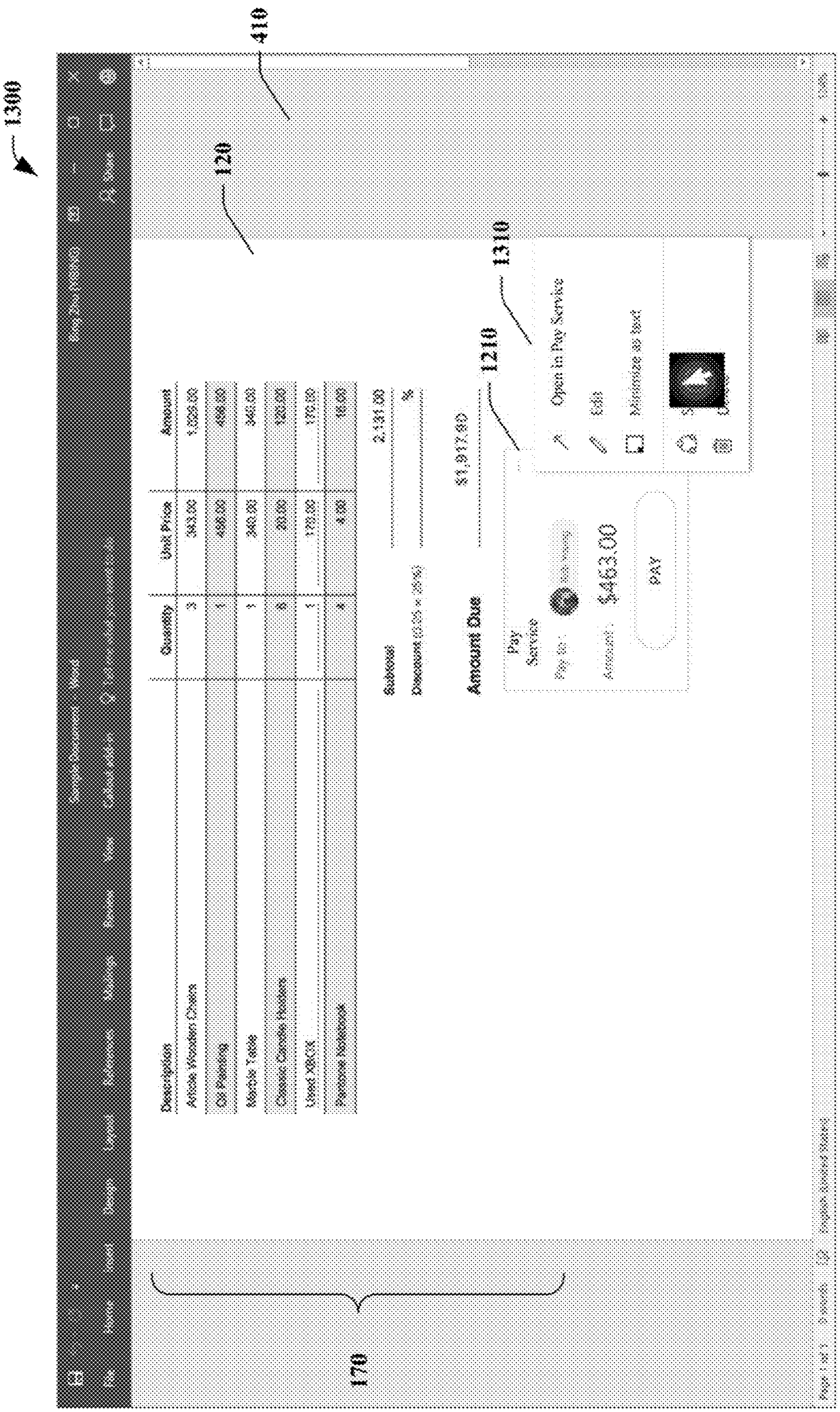

FIG. 13 illustrates an exemplary user interface 1300 generated by the application 110 and displayed by the client device 140. In this example, in response to the selection of the more options selection 1210, an options display area 1310 has been provided. The user 160 has selected the "share" option which allows the user 160 to share the instance of the action card 180 with other user(s).

Figure 14:
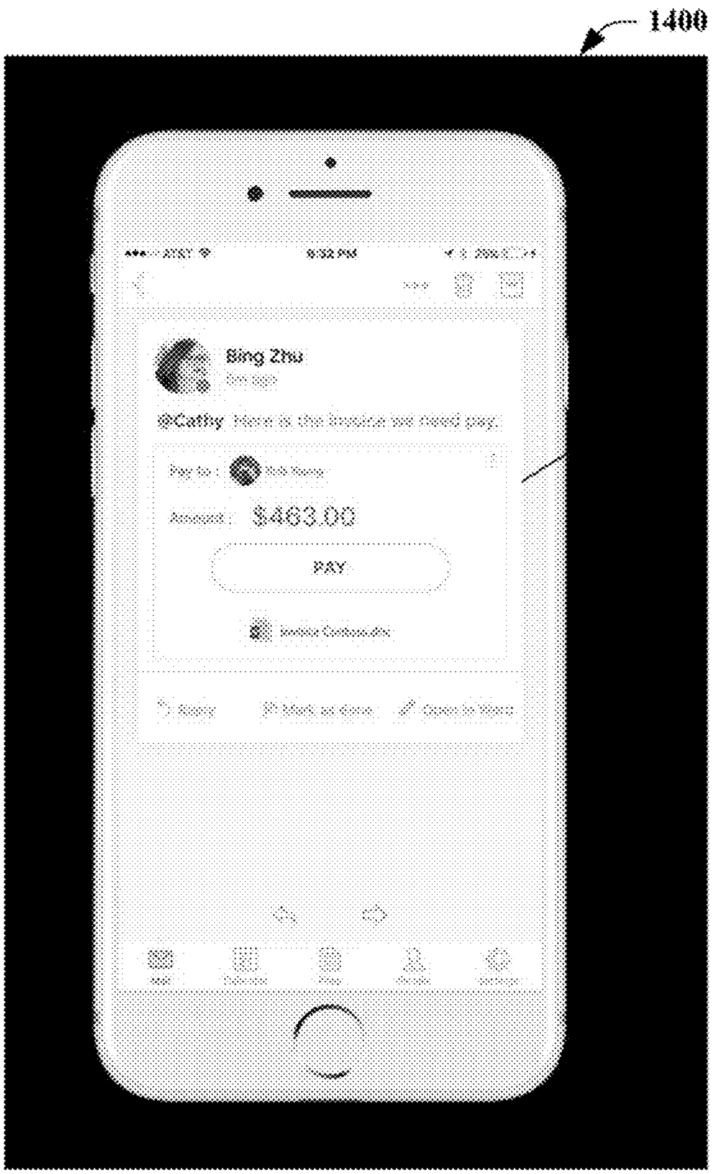

FIG. 14 illustrates an exemplary user interface 1400 generated by the application 110 and displayed by the client device 140. In this example, in response to the user selecting the "share" option, another user has received the instance of the action card 180, for example, in an email 1410.

In some embodiments, the user can share an instance of the action card 180 independently from the document 120 with a link to the document context. For example, a recipient user can select (e.g., click) the document link to open the document 120 with the document 120 navigated to the instance of the action card 180 embedded within in the document 120. The recipient user can then take action using the instance of the action card 180 embedded within the document 120.

Figure 15:
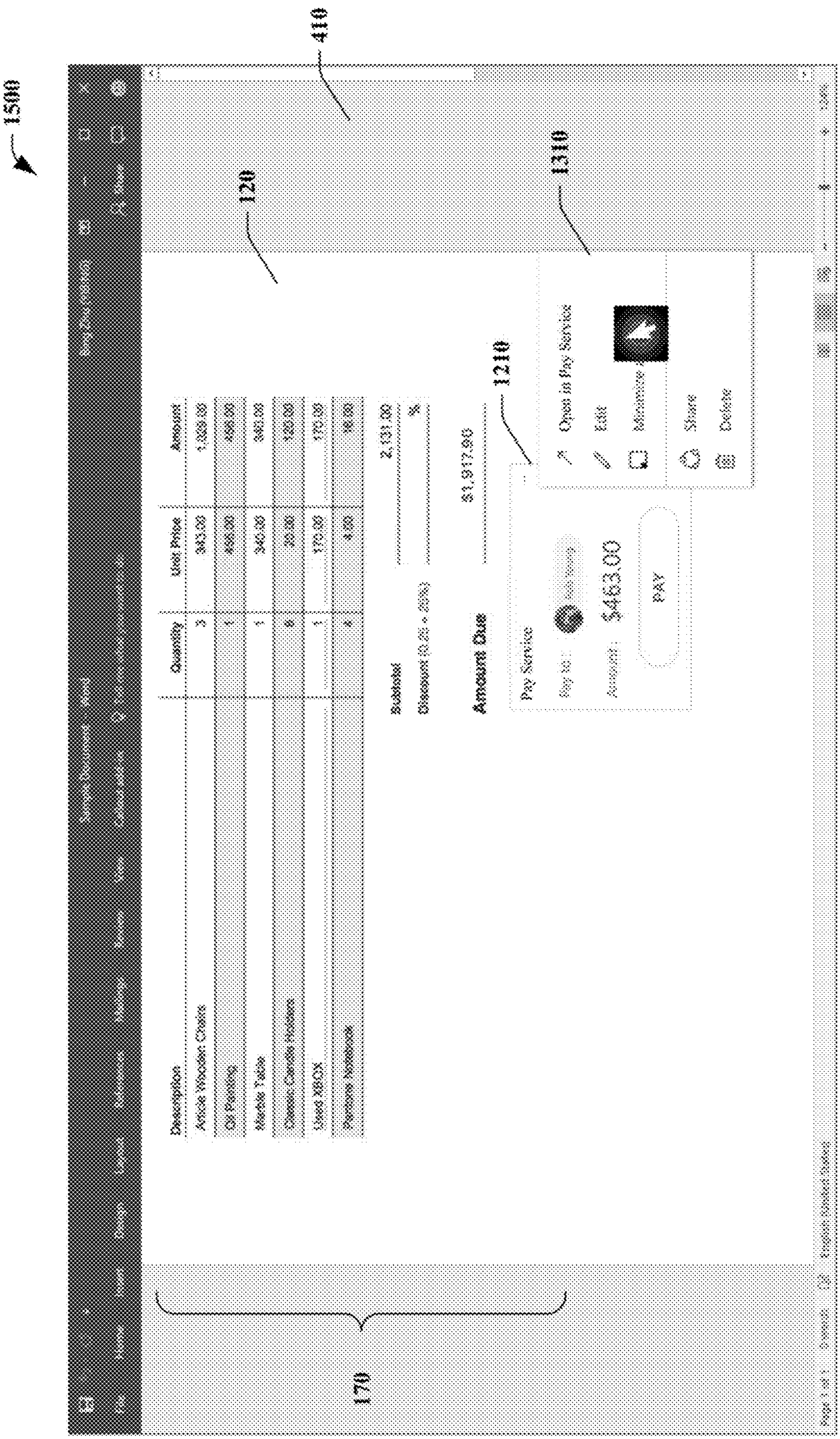

FIG. 15 illustrates an exemplary user interface 1500 generated by the application 110 and displayed by the client device 140. In this example, the user 160 has selected a "Minimize as text" option.

Figure 16:
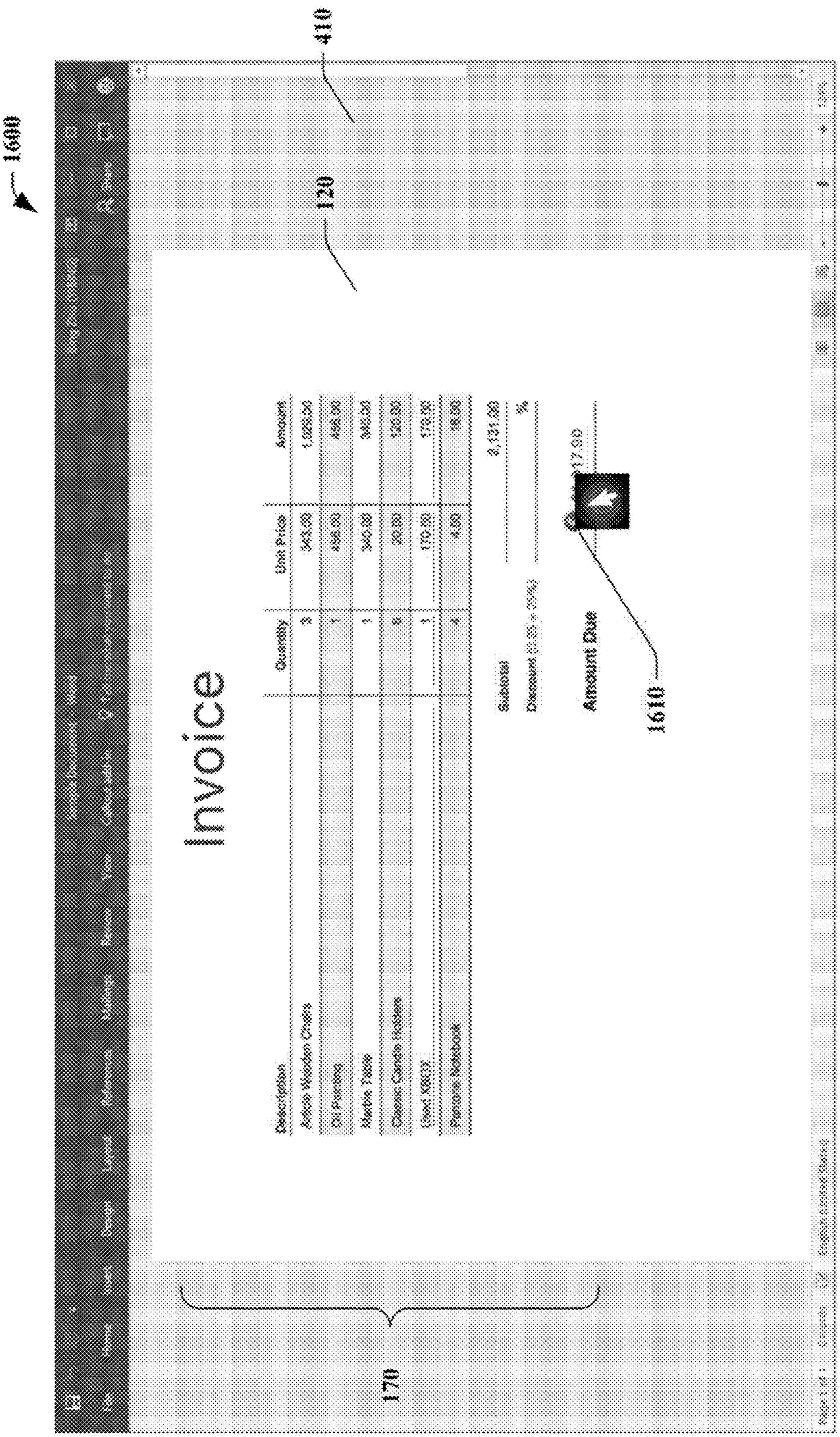

FIG. 16 illustrates an exemplary user interface 1600 generated by the application 110 and displayed by the client device 140. In this example, in response to selection of the "Minimize as text" option, an indication 1610 of an embedded action card 180 is provided in the document 120 with the service input/output area 710 not displayed.

Figure 17:
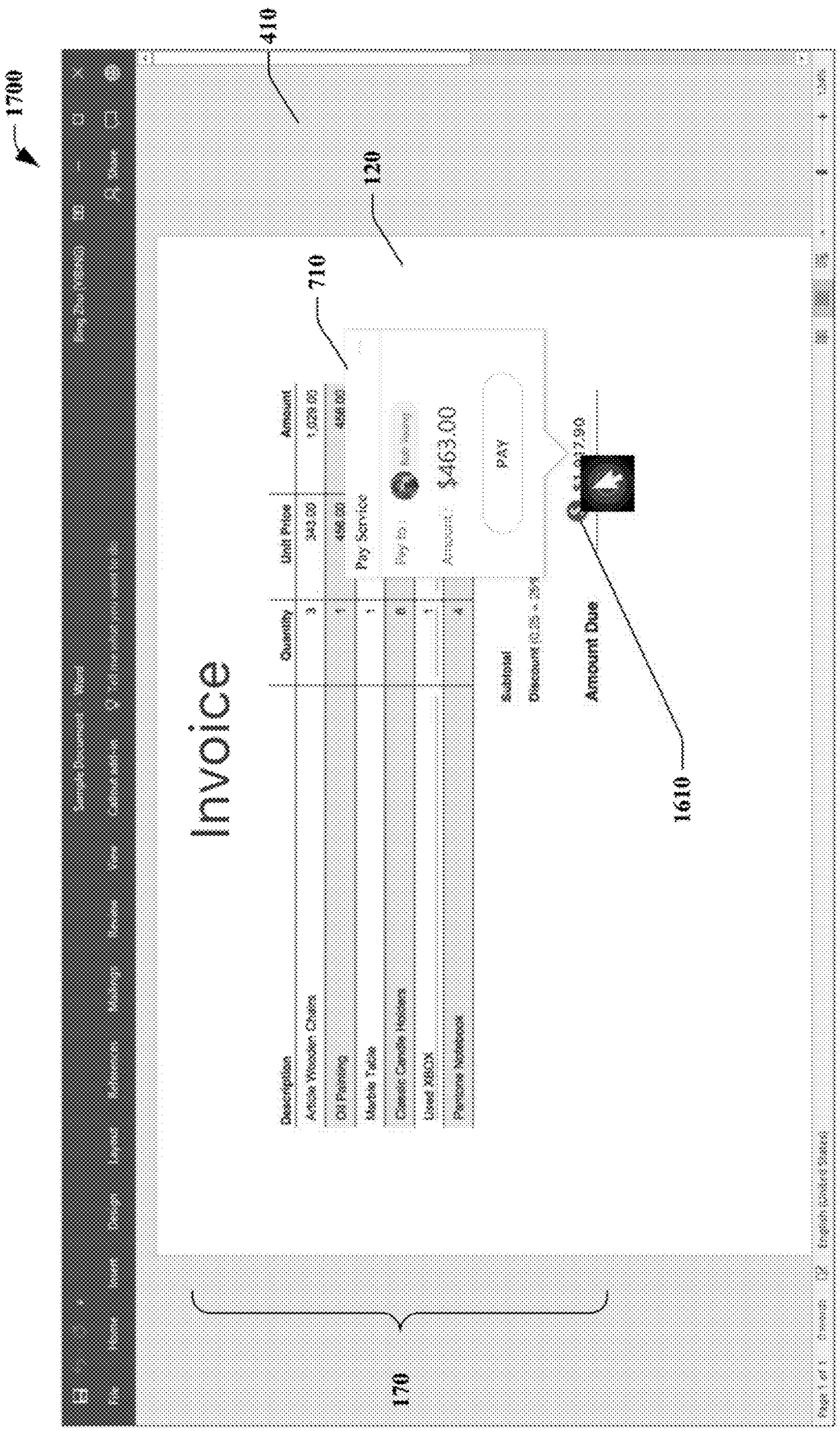

FIG. 17 illustrates an exemplary user interface 1700 generated by the application 110 and displayed by the client device 140. In this example, the user 160 has selected the minimized text indication 1610 causing the service input/output area 710 to be displayed.

Figure 18:
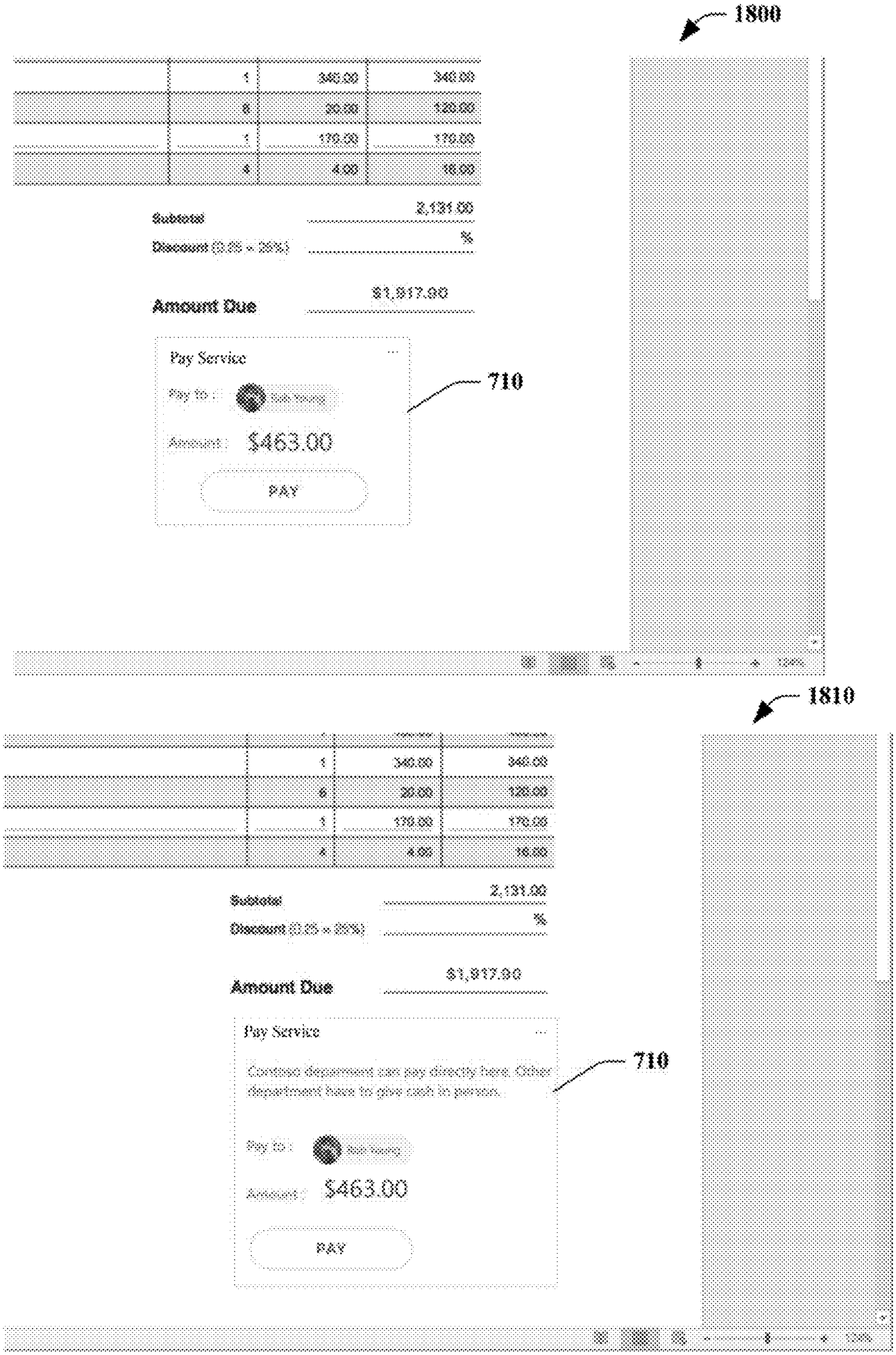

In some embodiments, once an instance of an action card 180 has been embedded in a document 150, the instance of the action card 180 is an editable object. FIG. 18 illustrates exemplary user interfaces 1800 and 1810 generated by the application 110 and displayed by the client device 140 is illustrated. An instance of an embedded action card 180 is displayed in the service input/output area 710 of user interface 1800. In response to user input, in user interface 1810, the instance of embedded action card 180 displayed in the service input/output area 710 has been edited to include additional text "Contoso department can pay directly here. Other department have to give cash in person.".

By way of example, and not limitation, FIGS. 19-30 illustrate an exemplary scenario of a user consuming a document 120 with instances of embedded action cards 190. For purposes of explanation, the document 120 relates to a new employee's first day at "Contoso".

Figure 19:

Referring to FIG. 19 an exemplary user interface 1900 generated by the application 110 and displayed by the client device 140. In this example, three instances 1910, 1920, 1930 of action cards 190 are displayed. Instances 1910 and 1920 include a displayed control "Join" with additional descriptive information. Instance 1930 includes an graphic icon and minimized text. In this example, a user 160 has activated (e.g., selected, hovered over, etc.) instance 1930.

Figure 20:
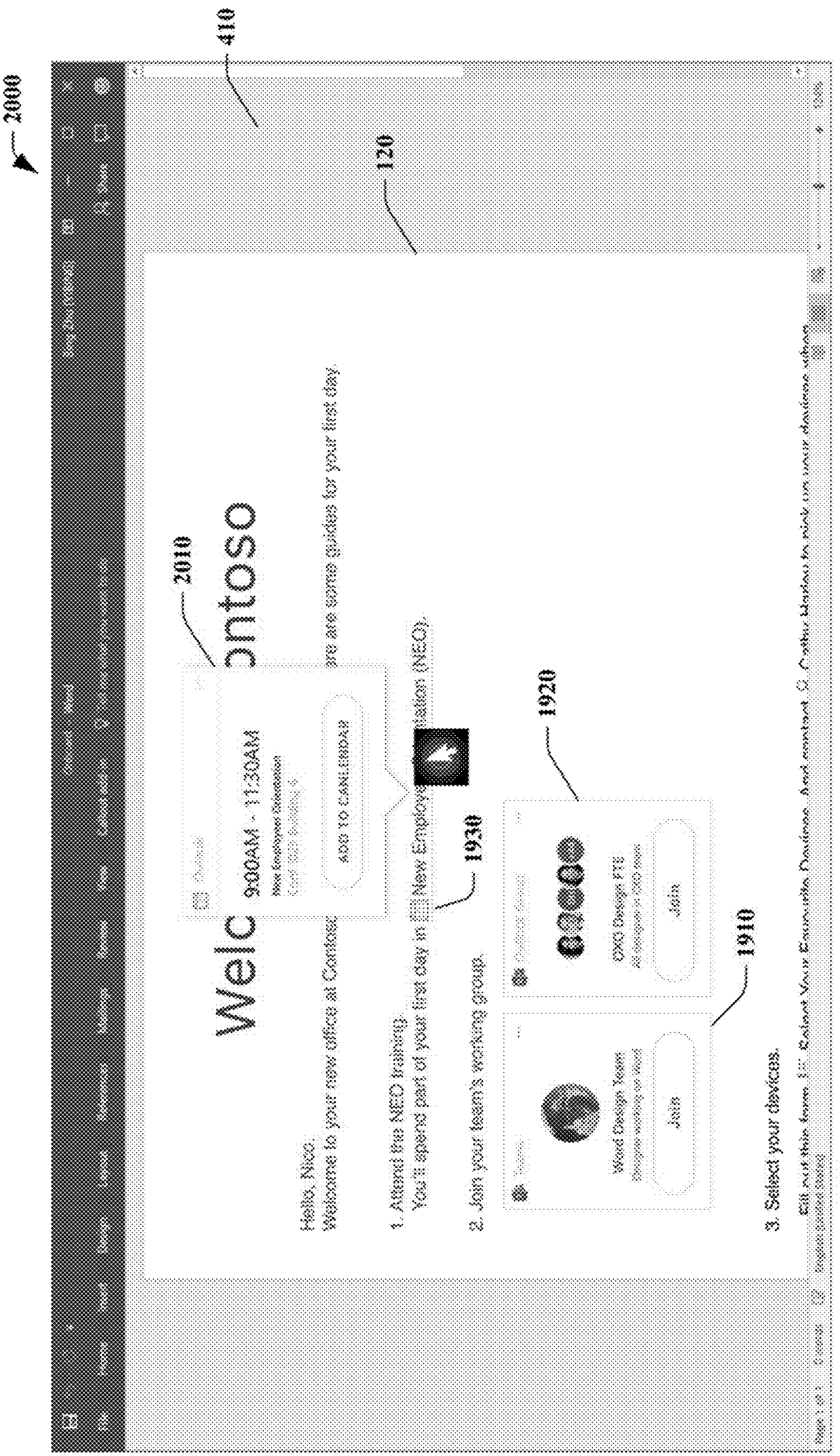

FIG. 20 illustrates an exemplary user interface 2000 generated by the application 110 and displayed by the client device 140. By way of example, and not limitation, in response to activation of instance 1930 by the user 160, an input/output area 2010 has been displayed. The user 160 can select a "add to calendar" control of the input/output area 2010 to have the instance 1930 to add appointment "New Employer Orientation" to the user's Outlook® calendar, with Outlook® being a service 130 available to the user 160.

Figure 21:
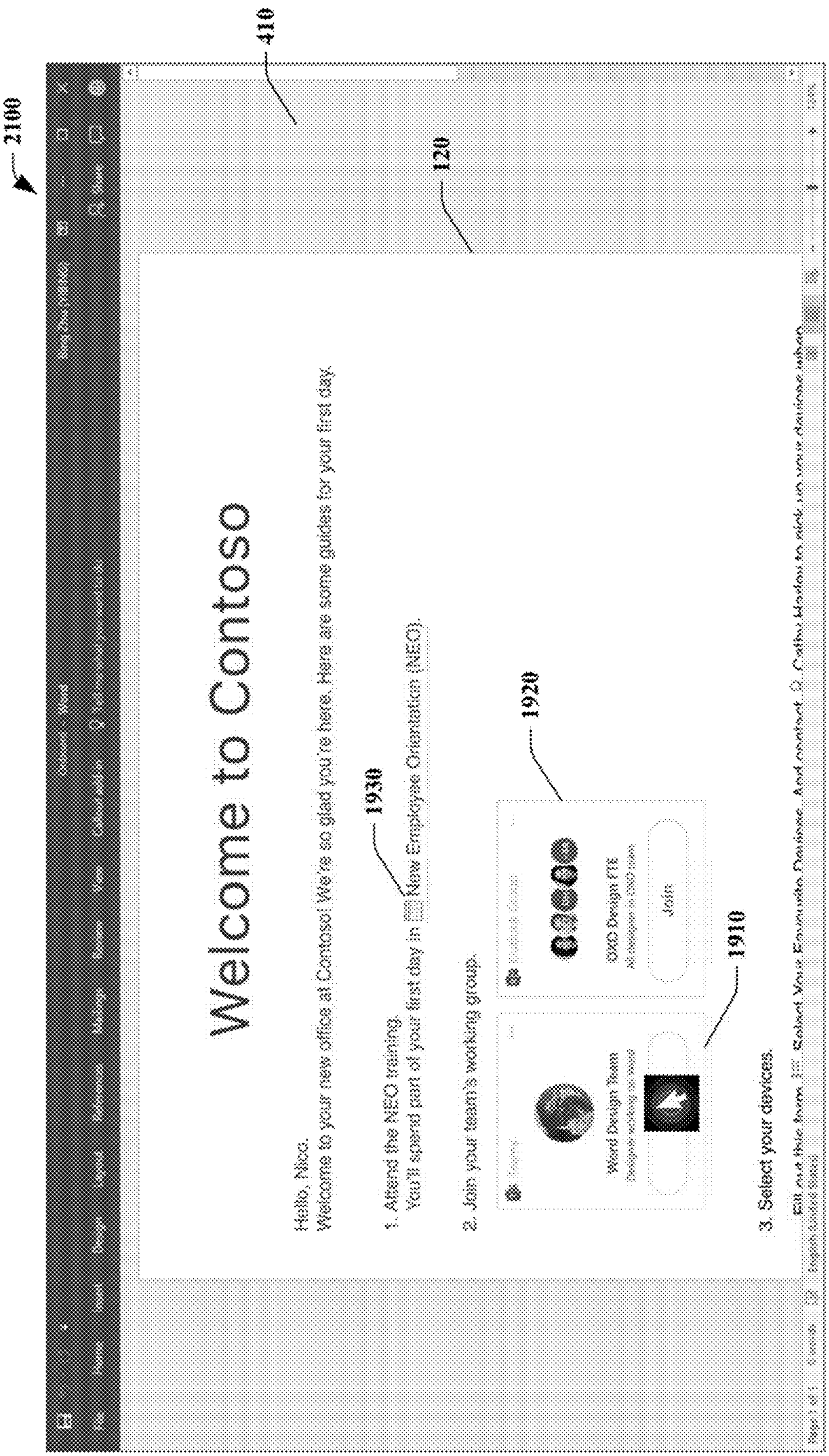

FIG. 21 illustrates an exemplary user interface 2100 generated by the application 110 and displayed by the client device 140. In this example, the user 160 has selected the "Join" control of instance 1910. In response to the user selection, the instance 1910 has interacted with a service 130 associated with "Teams".

Figure 22:
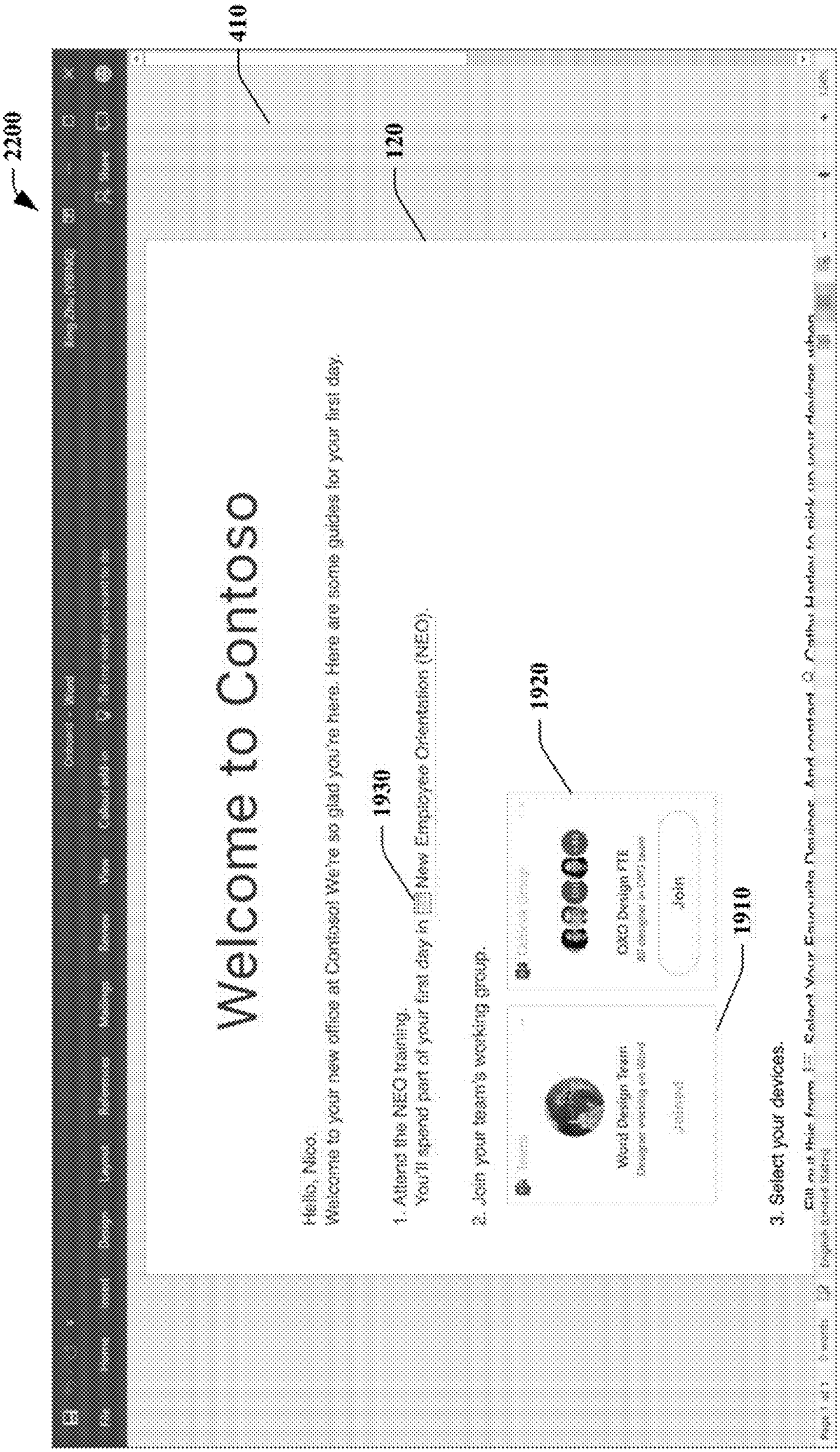

FIG. 22 illustrates an exemplary user interface 2200 generated by the application 110 and displayed by the client device 140. In this example, the display associated with instance 1910 has been updated (e.g., in real-time) to remove the control "Join" and indicates a change in status of the user 160 to "Joined" with respect to the service 130 associated with "Teams".

Figure 23:
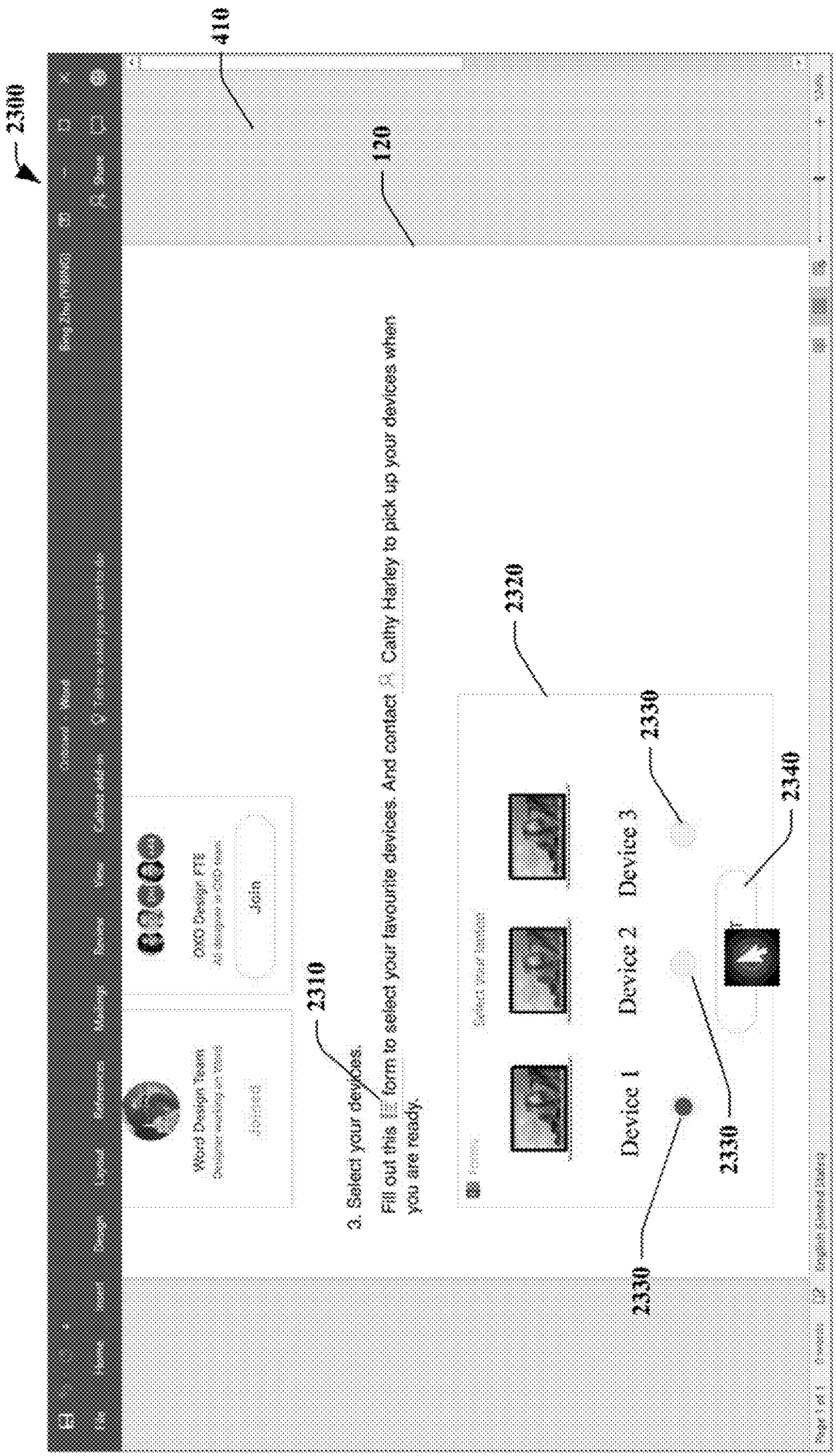

FIG. 23 illustrates an exemplary user interface 2300 generated by the application 110 and displayed by the client device 140. In this example, the user 160 has scrolled down in the document 120 to reveal a fourth instance 2310 of an embedded action card 180. Instance 2310 is associated with a form and includes an input/output area 2320 comprising three radio button selection controls 2330 and a "submit" control 2340. The user 160 has selected the first radio button selection control 2330 and activated the "submit" control 2340. In response to these inputs, the instance 2310 orders the selected device for the user 160 via a service 130 associated with the instance 2310.

Figure 24:
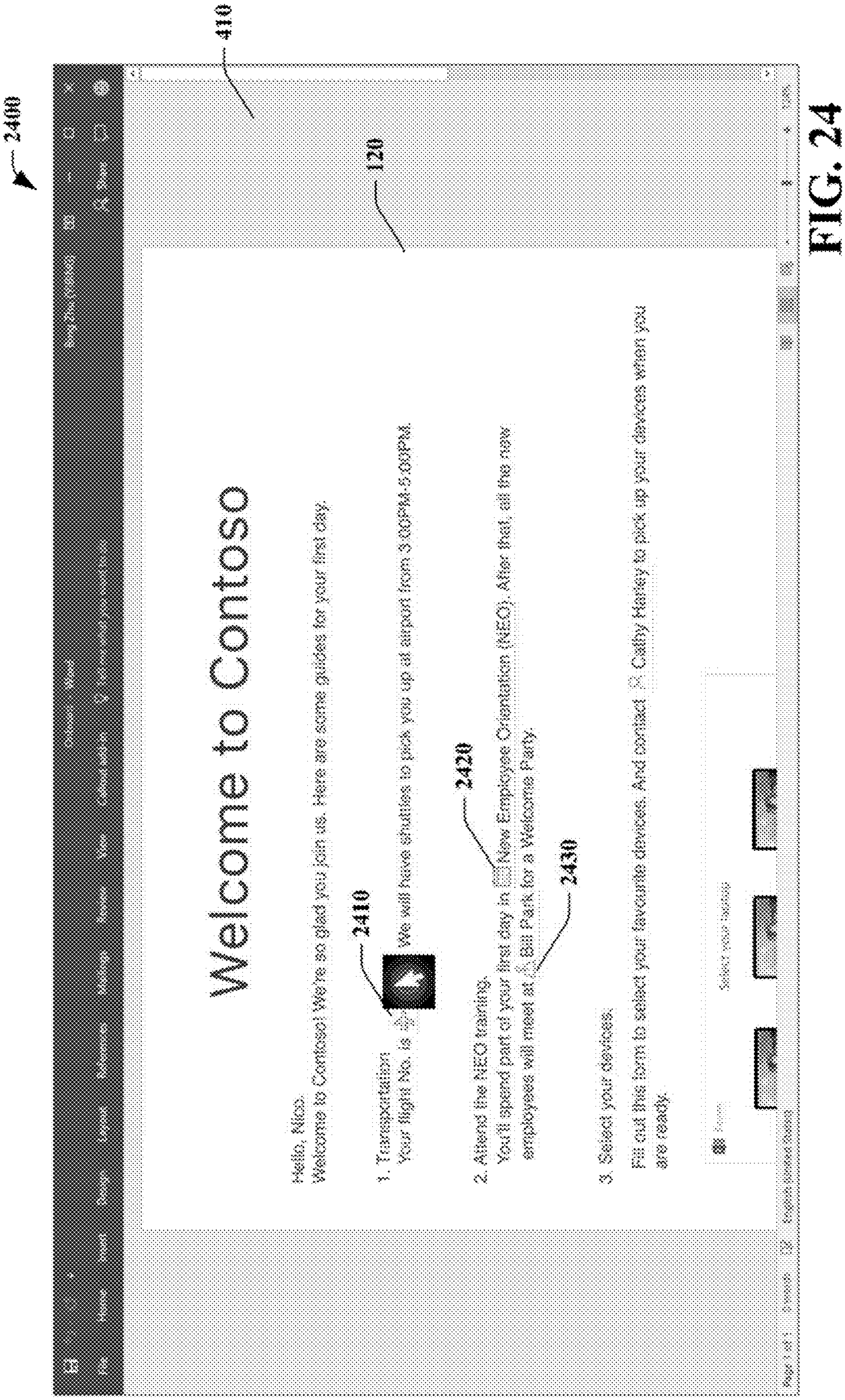

FIG. 24 illustrates an exemplary user interface 2400 generated by the application 110 and displayed by the client device 140. In this example, a user 160 is presented with another document 120 displaying three instances 2410, 2420, 2430 of embedded action cards 190. The user 160 has activated (e.g., selected, hovered over, etc.) instance 2410.

Figure 25:
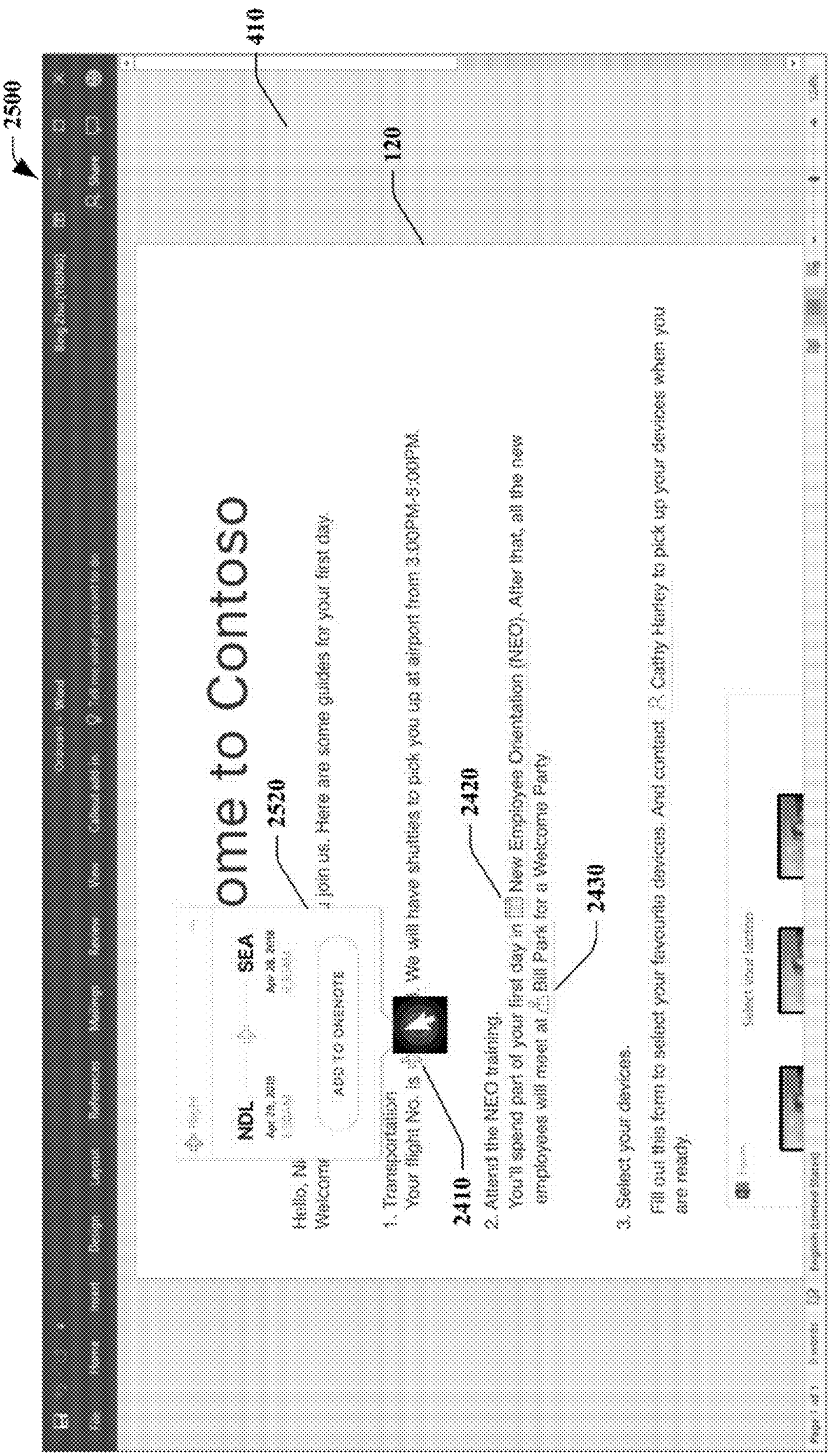

FIG. 25 illustrates an exemplary user interface 2500 generated by the application 110 and displayed by the client device 140. In this example, in response to the user activation of instance 2410, an input/output area 2520 is displayed which includes flight information 2530 and a control 2540 to "add to Onenote".

Figure 26:
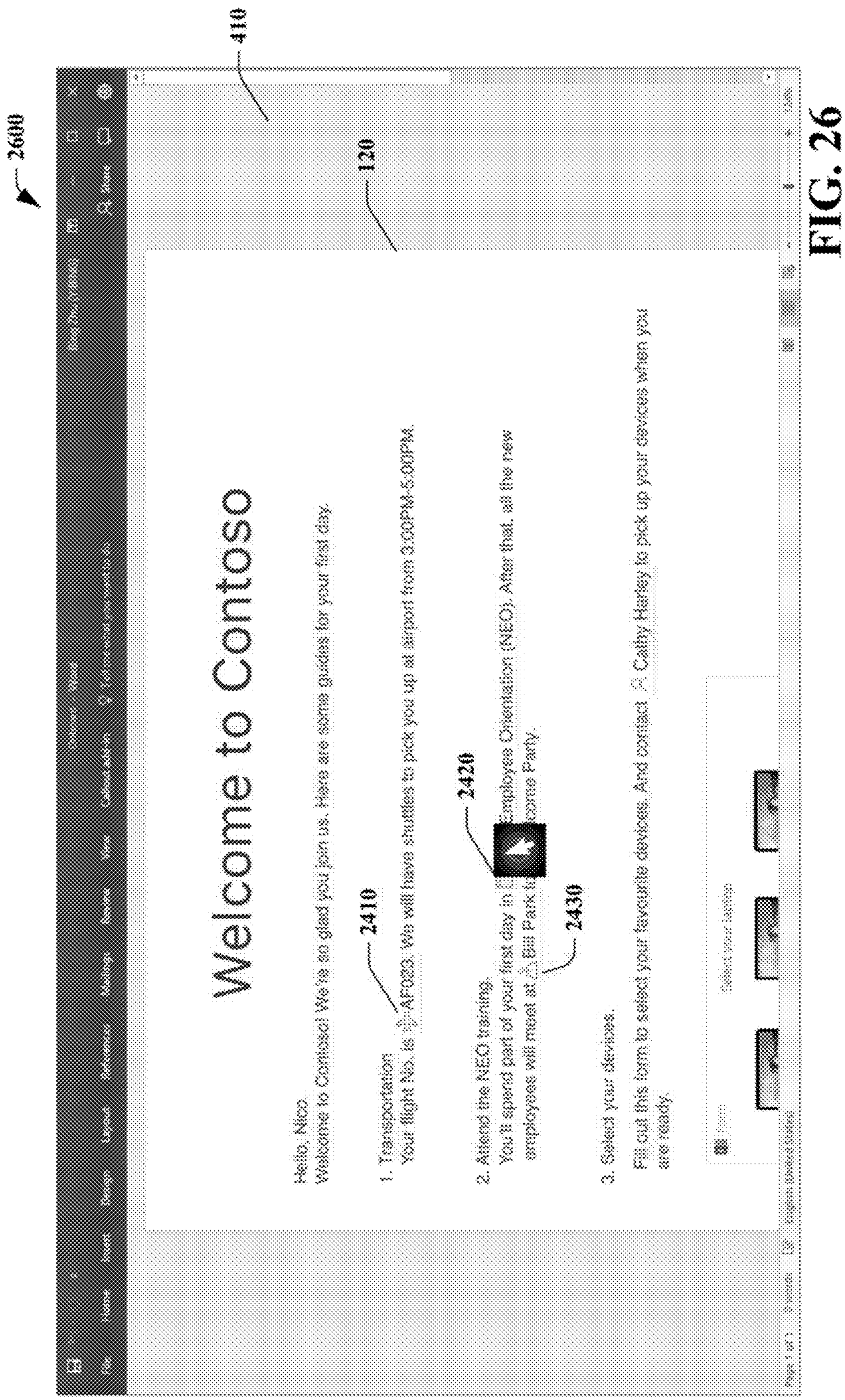

FIG. 26 illustrates an exemplary user interface 2600 generated by the application 110 and displayed by the client device 140. In this example, the user 160 has activated (e.g., selected, hovered over, etc.) instance 2420 with minimized text "New Employee Orientation (NEO)".

Figure 27:
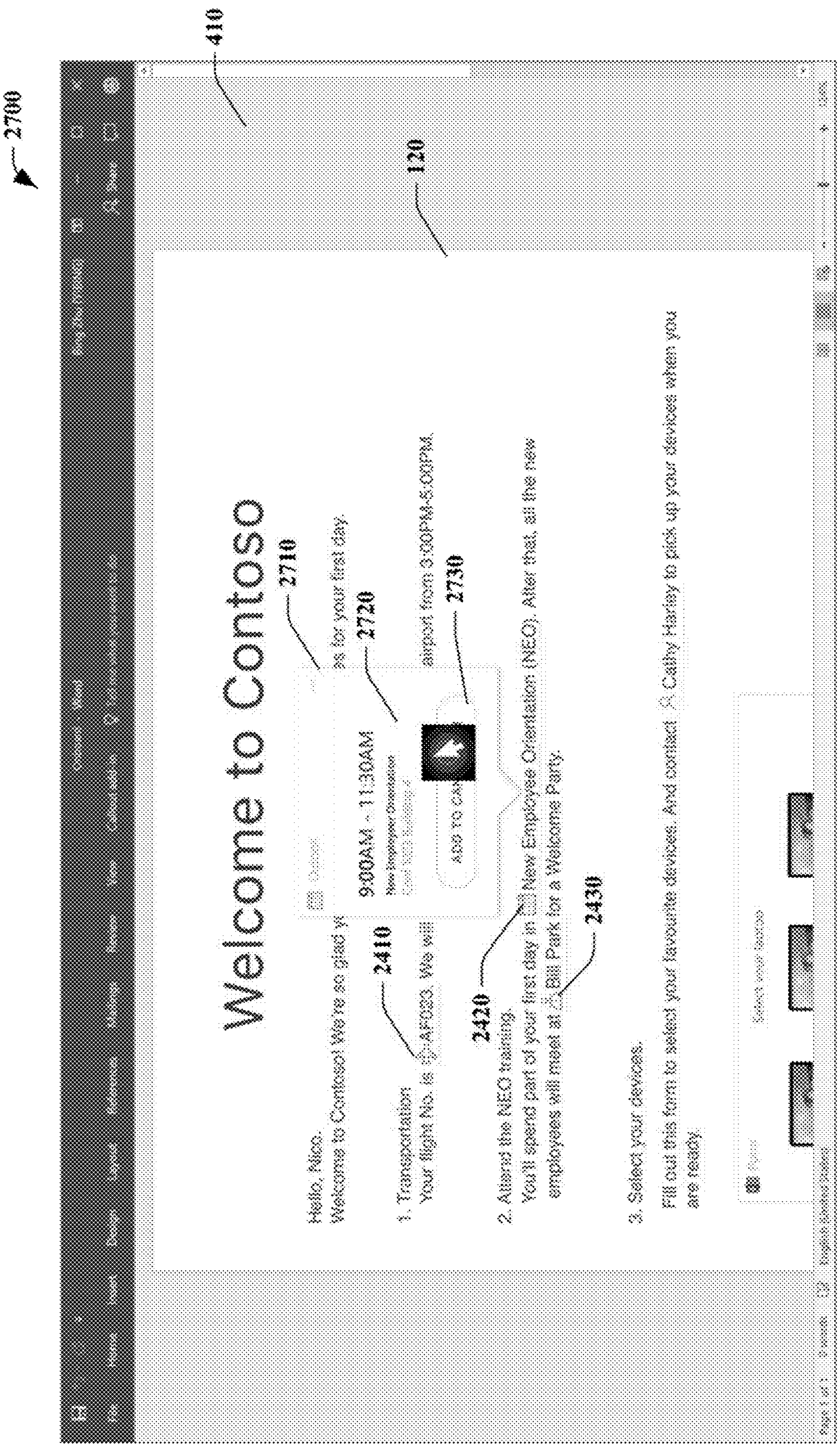

FIG. 27 illustrates an exemplary user interface 2700 generated by the application 110 and displayed by the client device 140. In this example, in response to the user activation of instance 2420, an input/output area 2710 is displayed which includes event information 2720 and a control 2730 to "add to Calendar". The user 160 has selected the control 2730 which causes instance 2710 to add appointment "New Employee Orientation" to the user's Outlook® calendar.

Figure 28:
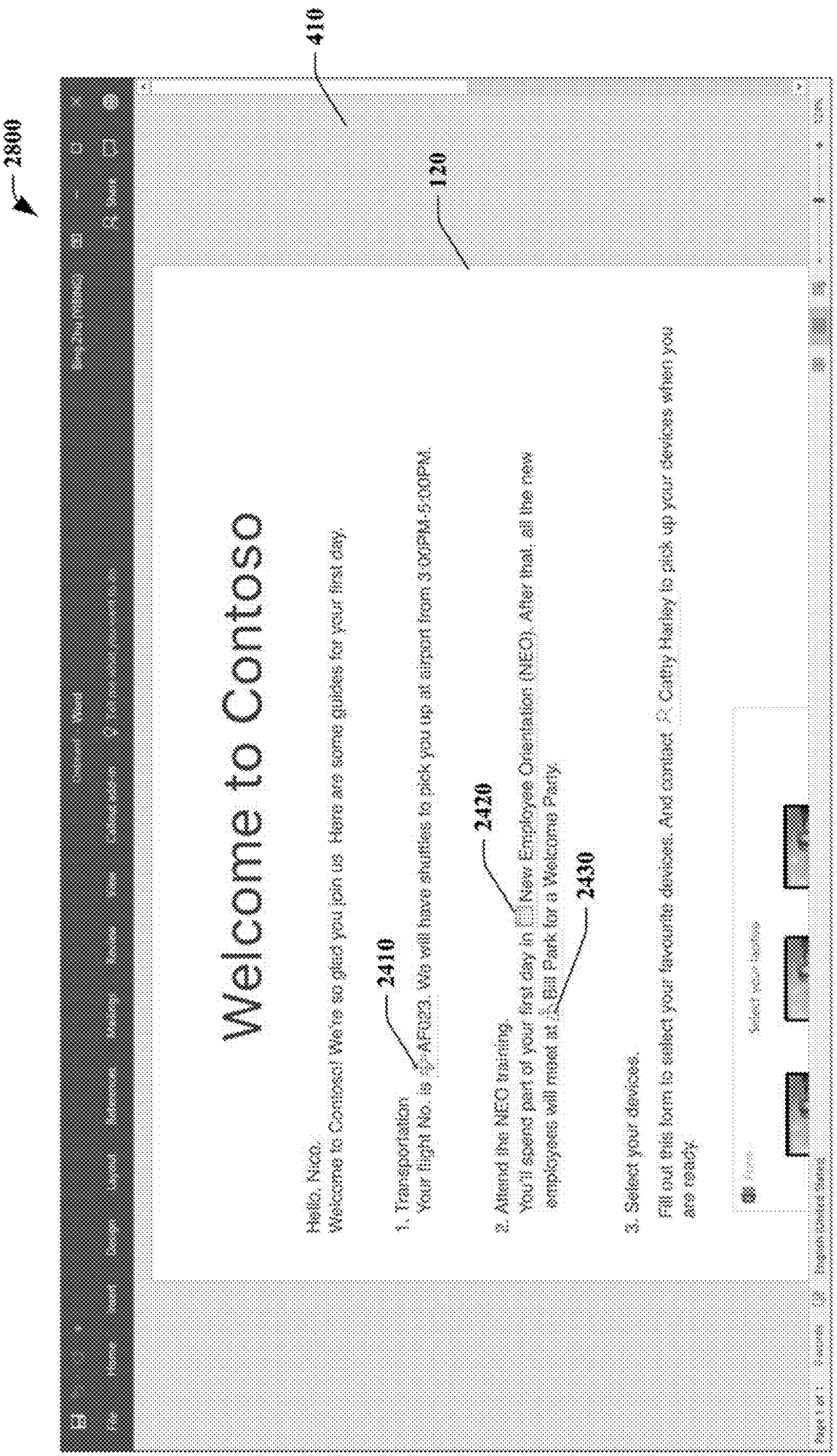

FIG. 28 illustrates an exemplary user interface 2800 generated by the application 110 and displayed by the client device 140. In this example, the document 120 again includes instances 2410, 2420, 2430.

Figure 29:
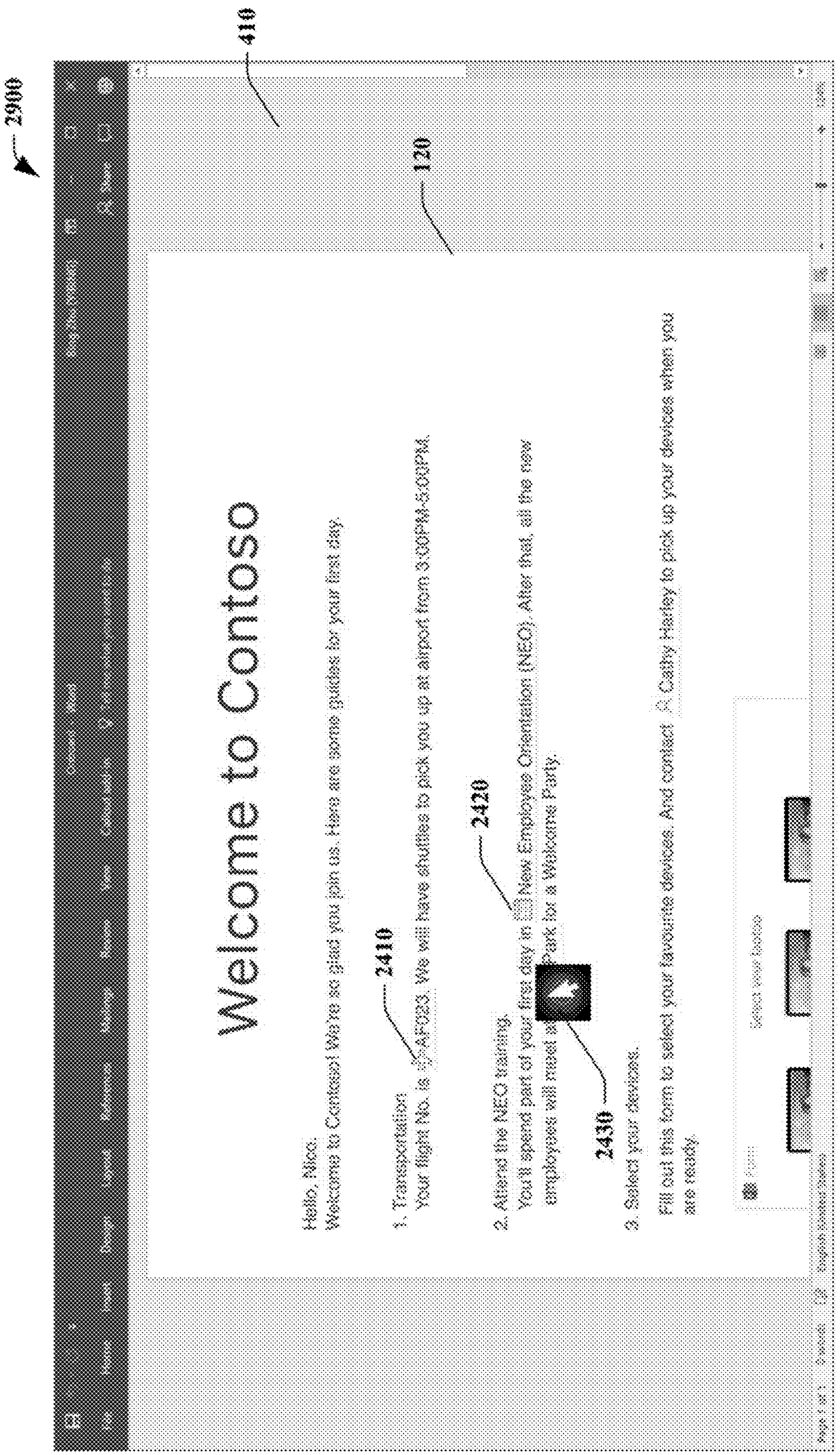

FIG. 29 illustrates an exemplary user interface 2900 generated by the application 110 and displayed by the client device 140. In this example, the user 160 has activated (e.g., selected, hovered over, etc.) instance 2430.

Figure 30:
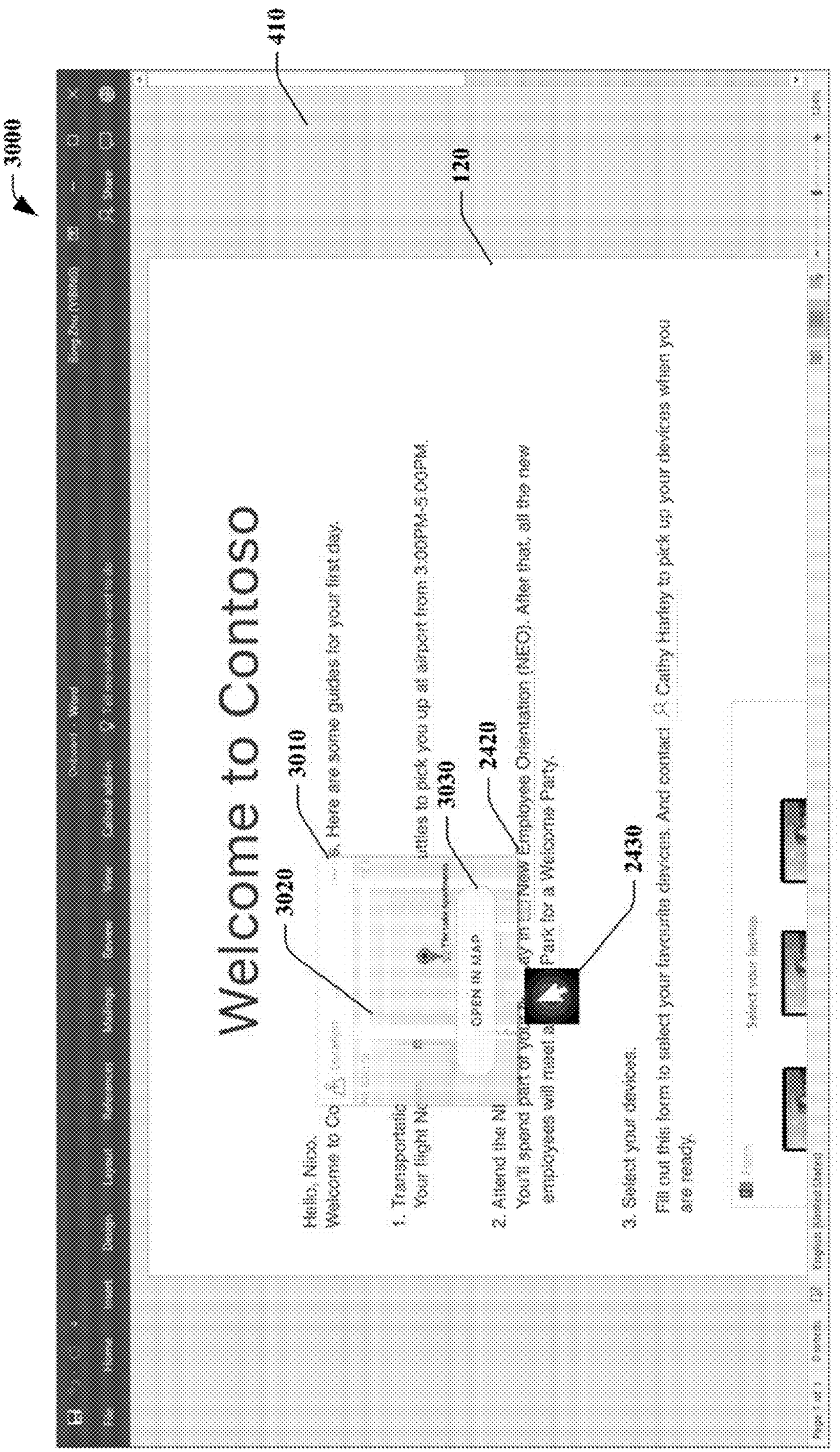

By way of example, and not limitation, FIG. 30 illustrates an exemplary user interface 30 generated by the application 110 and displayed by the client device 140. In this example, in response to the user activation of instance 2430, an input/output area 3010 is displayed. In this example, the input/output area 3010 includes a map 3020 and a control 3030 "Open in Map".

Figure 31:
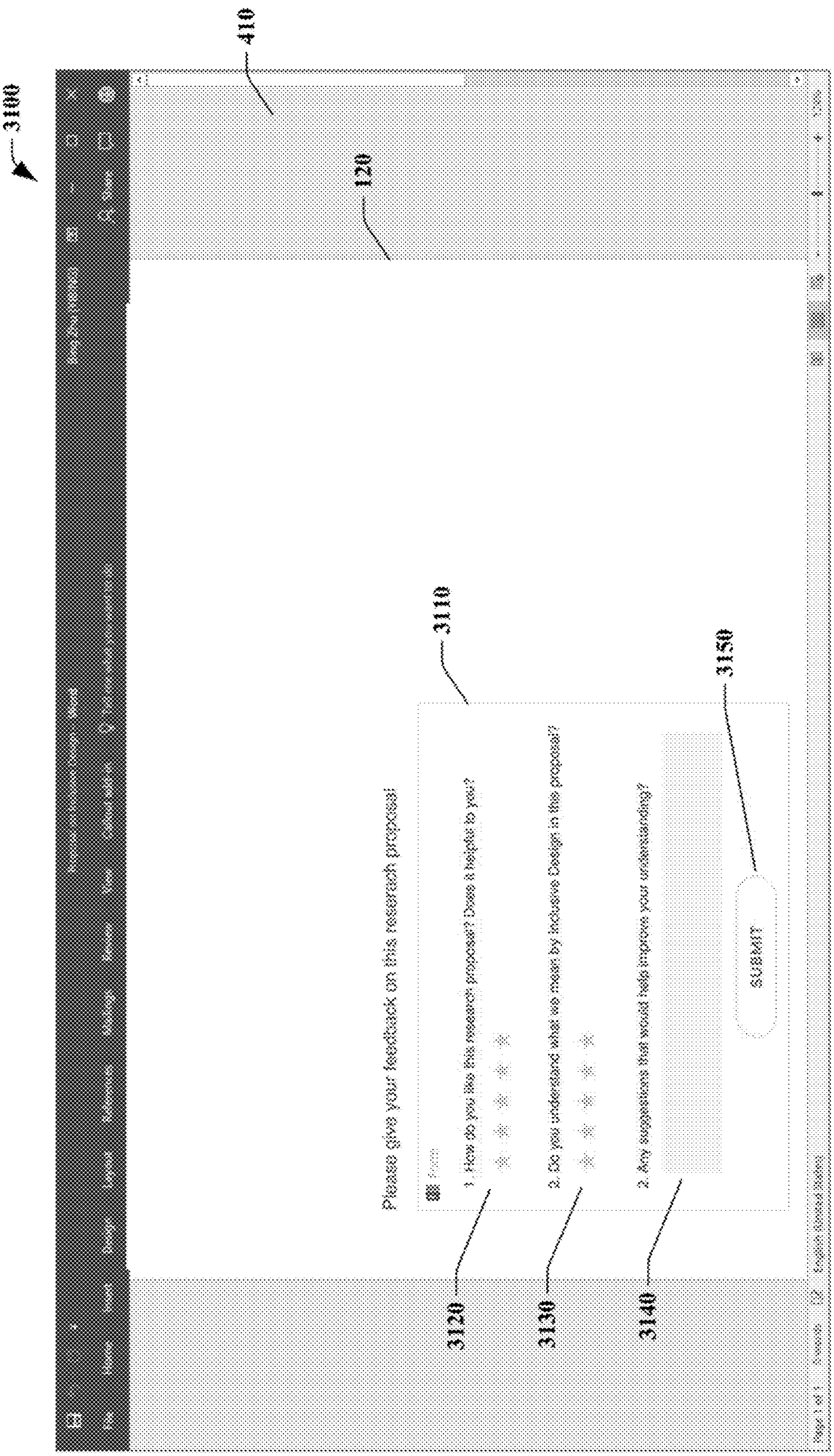

In some embodiments, instances of action card(s) 190 can be based upon form(s) used to provide data to service(s) 130. By way of example, and not limitation, FIG. 31 illustrates an exemplary user interface 3100 generated by the application 110 and displayed by the client device 140. In this example, a document 120 includes an instance 3110 of an action card 180. The instance 3110 includes two questions with star ratings 3120, 3130, a text entry question 3140 and a submit control 3150. In response to a user 160 activating the submit control 3150, information entered by the user in response to the feedback questions 3120, 3130, 3140 will be provided to a service 130 associated with the instance 3110 (e.g., in real-time).

Figure 32:
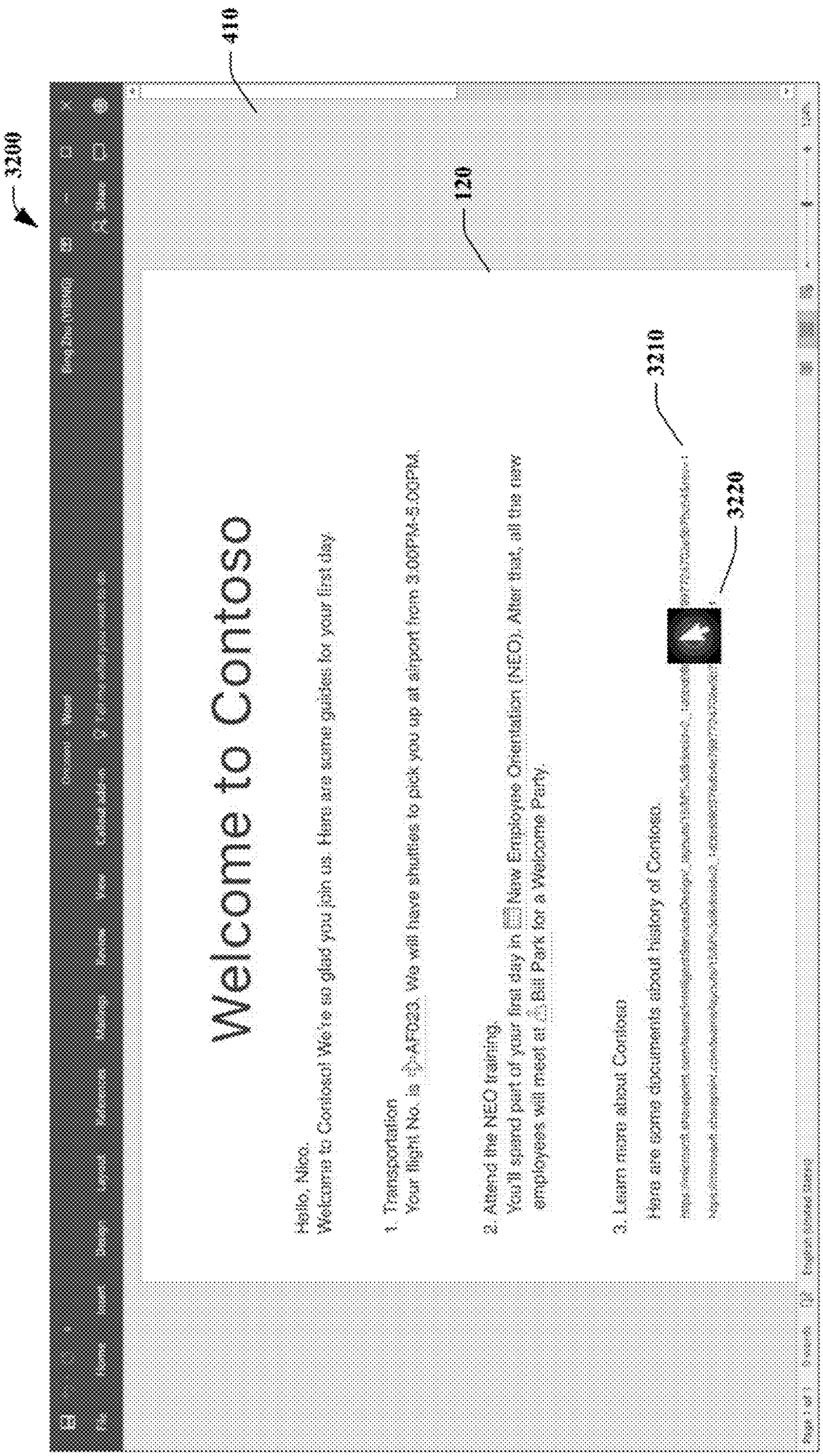

In some embodiments, instances of action card(s) 190 can be utilized to preview document(s). By way of example, and not limitation, FIG. 32 illustrates an exemplary user interface 3200 generated by the application 110 and displayed by the client device 140. In this example, a document 120 includes two instances 3210, 3220 of action cards 190 for previewing documents. A user 160 has activated instance 3210.

Figure 33:
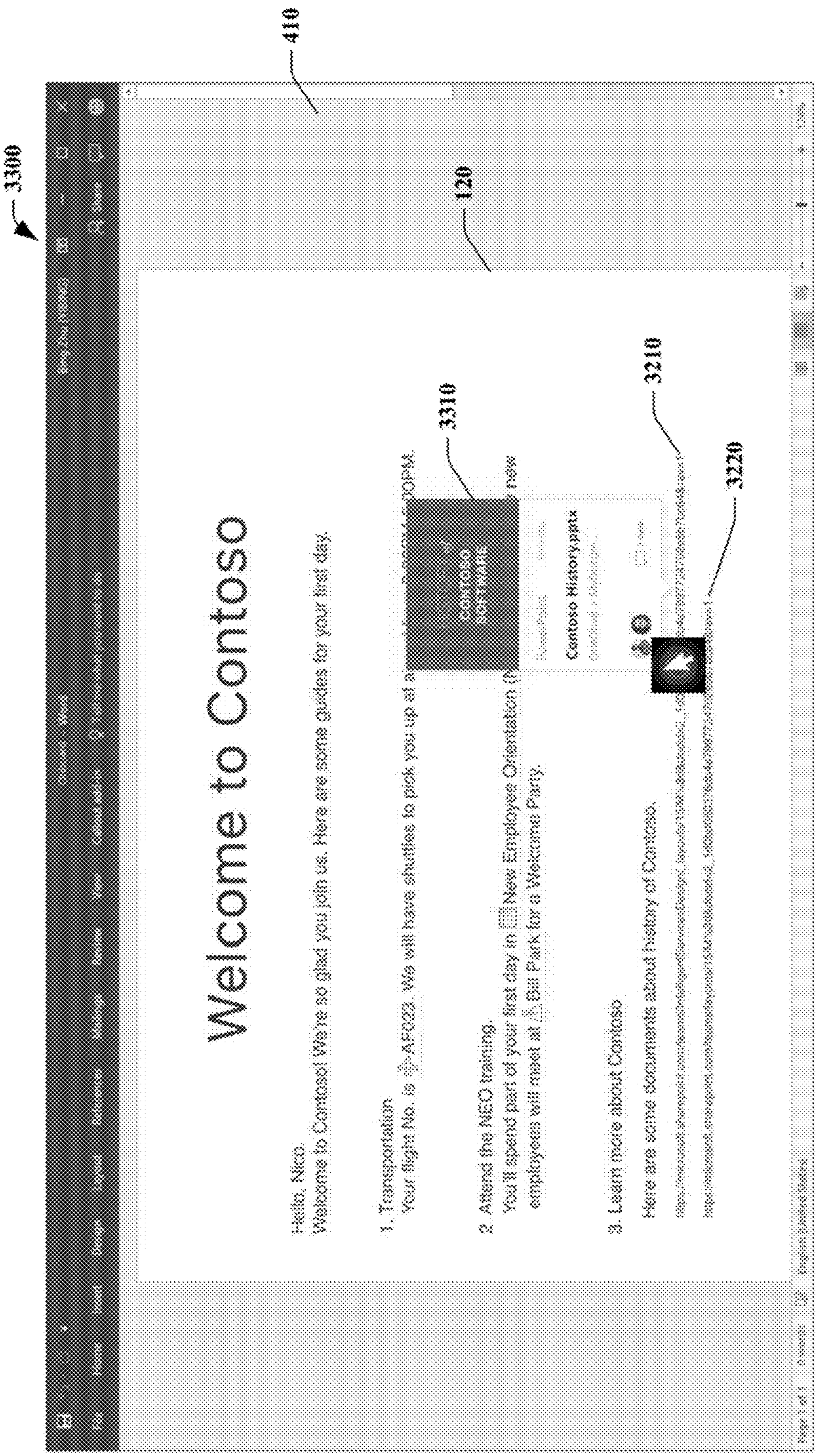

By way of example, and not limitation, FIG. 33 illustrates an exemplary user interface 3300 generated by the application 110 and displayed by the client device 140. In this example, in response to the user activation of instance 3210, an input/output area 3310 is displayed providing previewing information regarding a document associated with the instance 3210.

Figure 34:
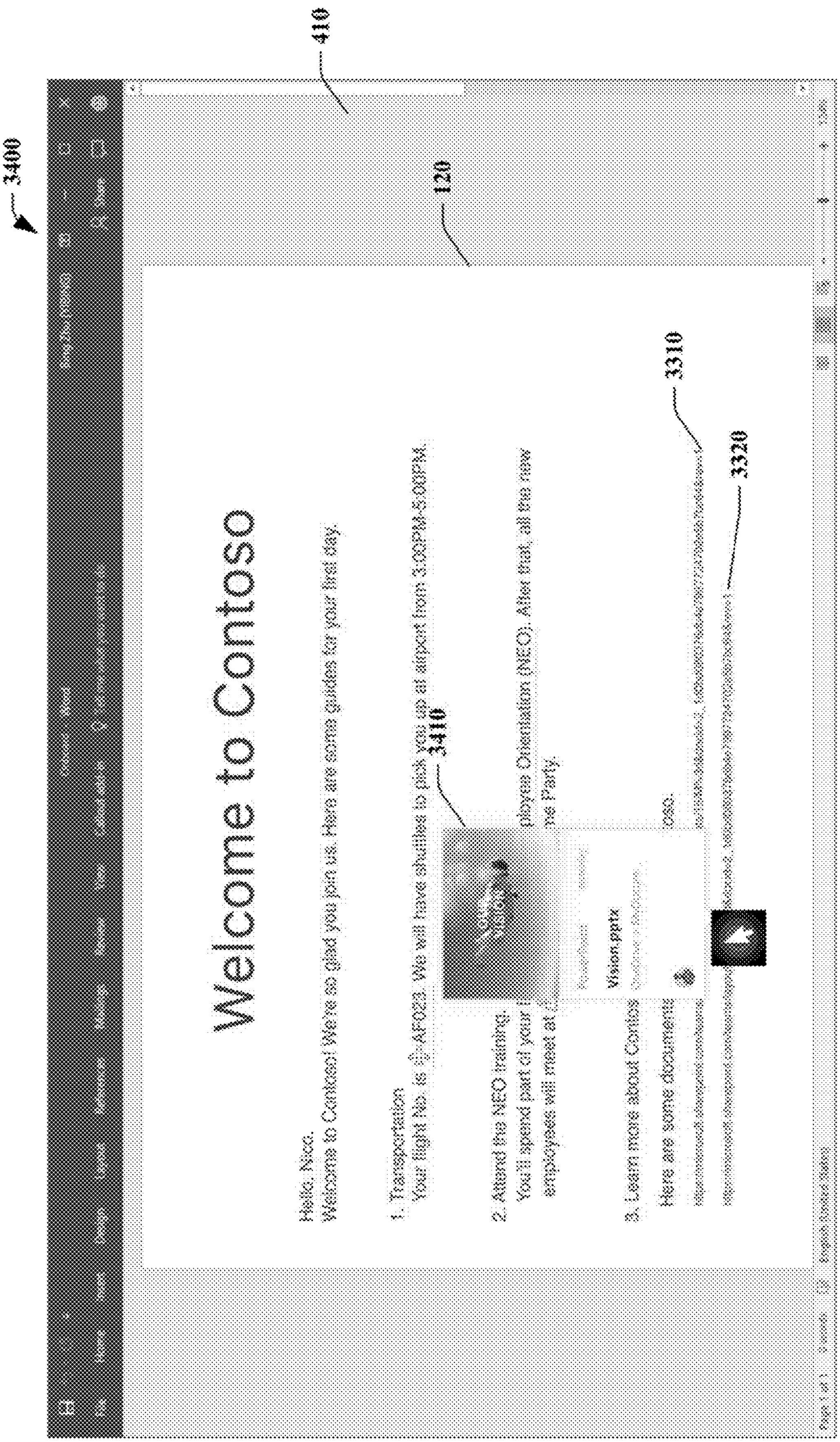

By way of example, and not limitation, FIG. 34 illustrates an exemplary user interface 3400 generated by the application 110 and displayed by the client device 140. In this instance, the user 160 has activated (e.g., hovered over) instance 3220 causing an input/output area 3410 to be displayed by the instance 3220.

Figure 35:
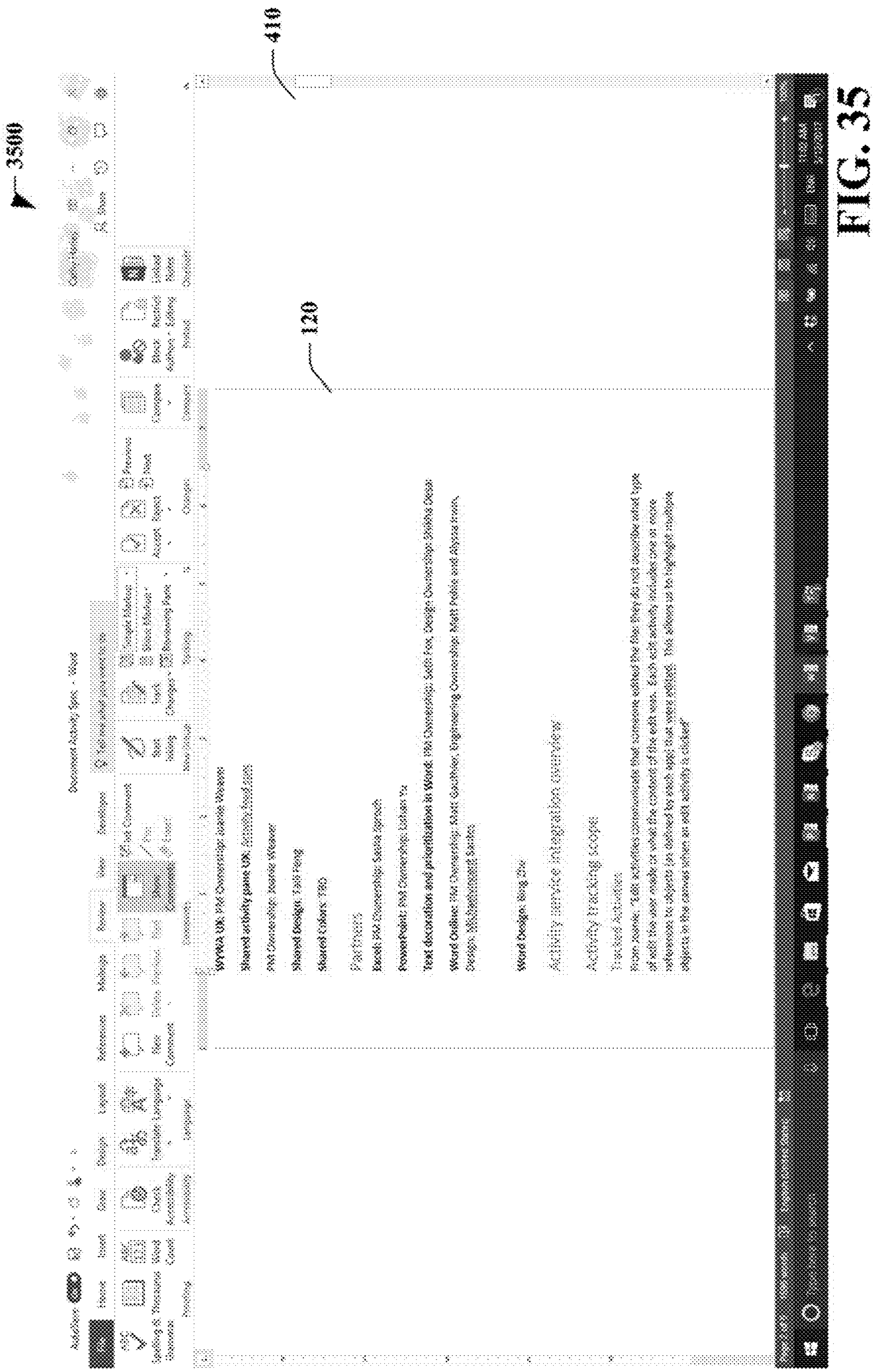

In some embodiments, instances of action cards 190 can be utilized to communicate with services 130 for project management. By way of example, and not limitation, FIG. 35 illustrates an exemplary user interface 3500 generated by the application 110 and displayed by the client device 140. In this example, a document 120 having project management content is displayed.

Figure 36:
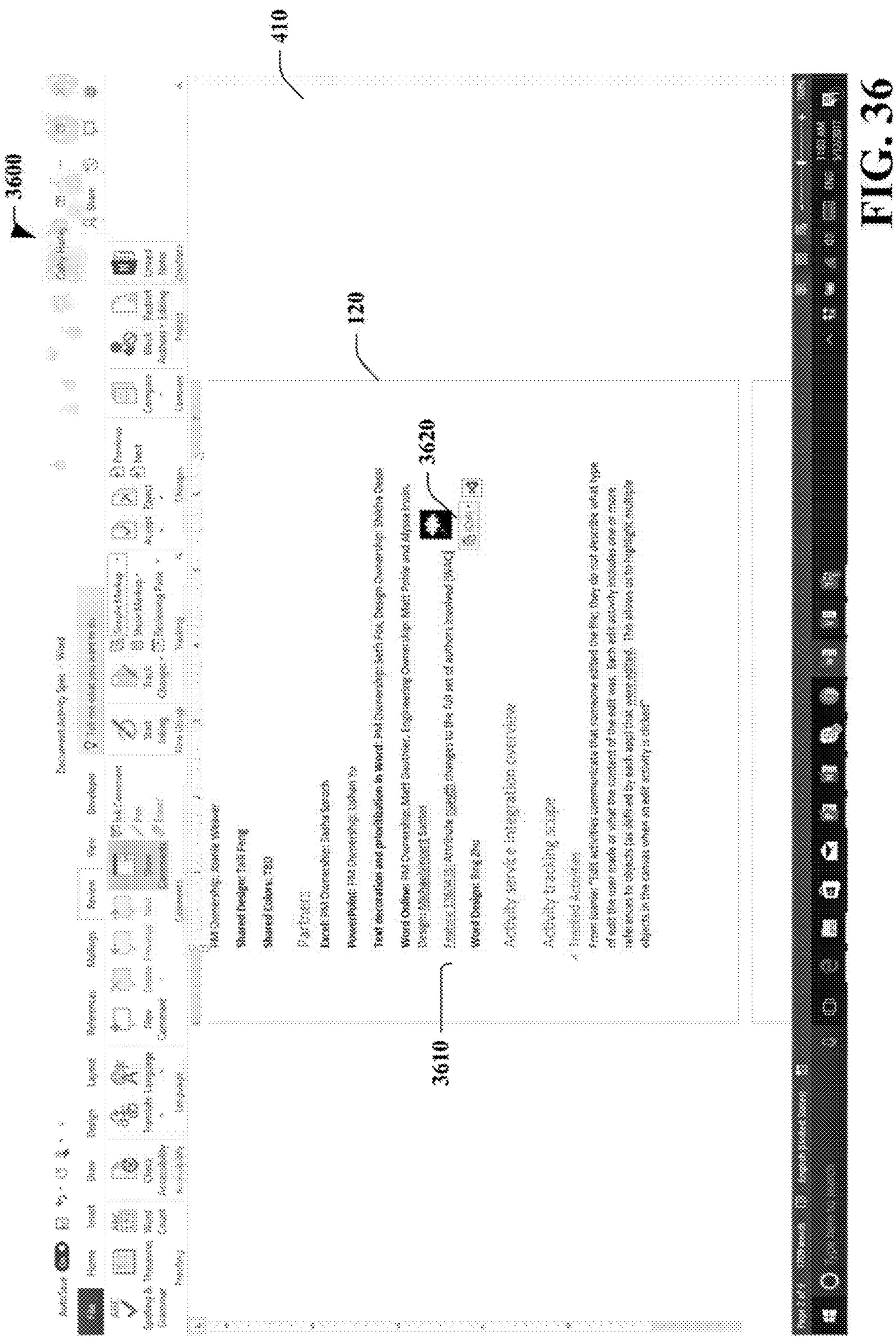

By way of example, and not limitation, FIG. 36 illustrates an exemplary user interface 3600 generated by the application 110 and displayed by the client device 140. In this example, a user 160 has added content 3610 to the document 120. The added content 3610 was copied and pasted from a service 130 associated with a project management application. In response to the added content 3610, the application 110 has detected that an action card 180 is available for content from the service 130 associated with the project management application. In response to this detection, a control 3620 has been added which allows the user 160 to embedded an instance of the action card 180 available for the service 130 associated with the project management application.

Figure 37:
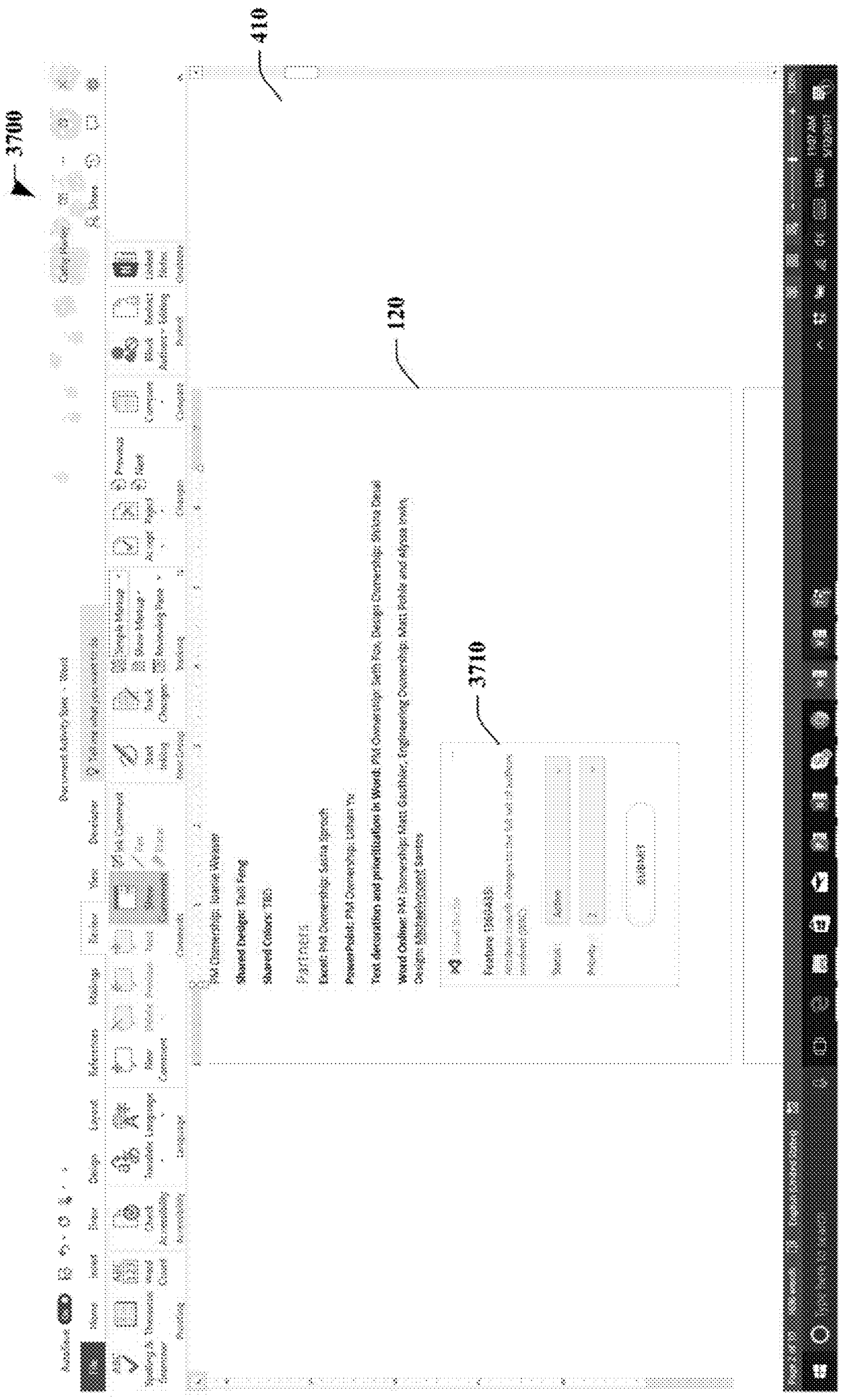

By way of example, and not limitation, FIG. 37 illustrates an exemplary user interface 3700 generated by the application 110 and displayed by the client device 140. In this example, a user 160 has selected the control to embed an instance of the action card 180 for the project management service 130. In response to the selection, an input/output area 3710 associated with the project management service 130 is populated with information obtained in real-time from the project management service 130 based upon the copied and pasted content 3610.

Figure 38:
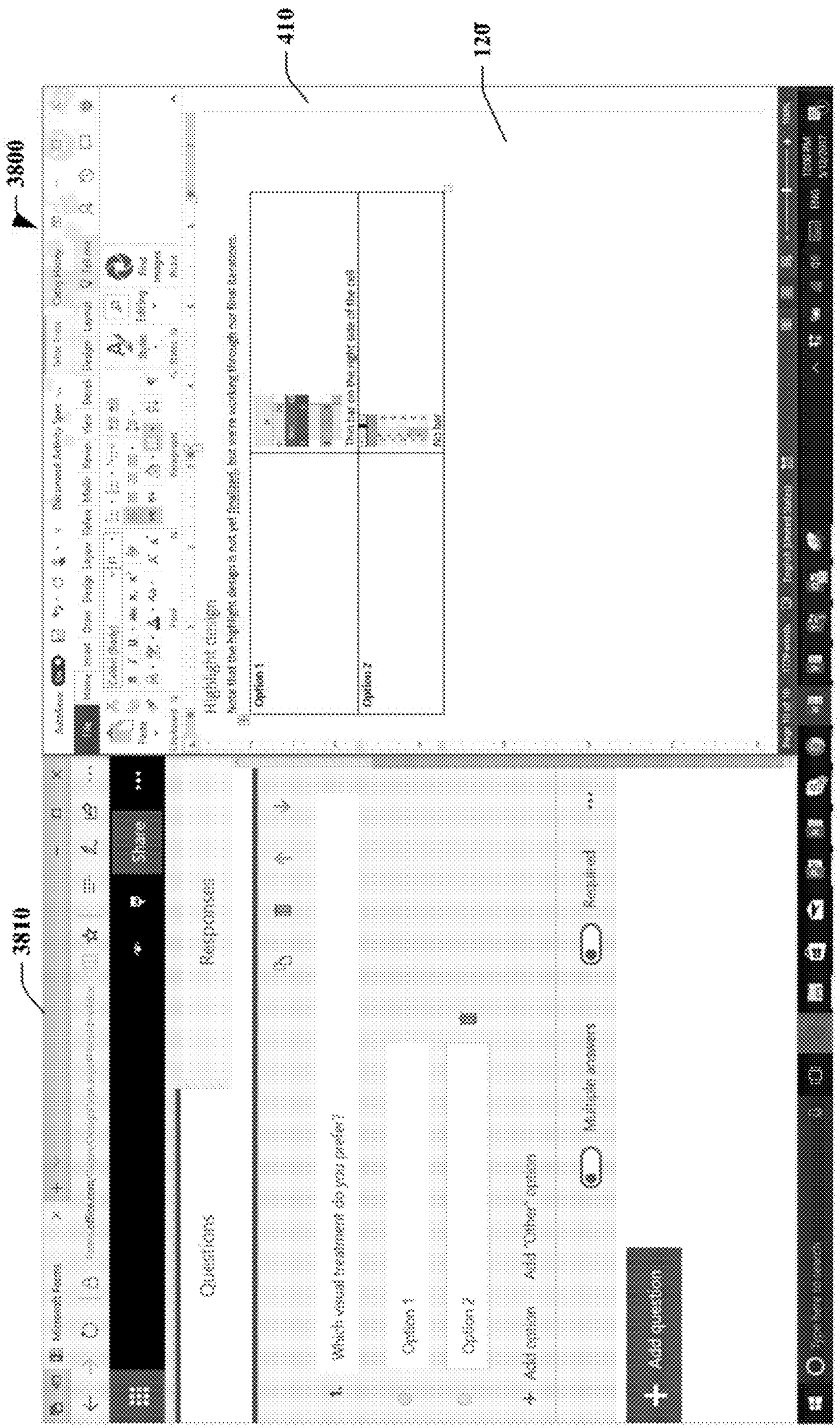

In some embodiments, instances of action cards 190 can be utilized to communicate with services 130 for forms. By way of example, and not limitation, FIG. 38 illustrates an exemplary user interface 3800 generated by the application 110 and displayed by the client device 140. In this example, a user 160 is working with a document 120 of the application 110 and with an online form application 3810.

Figure 39:
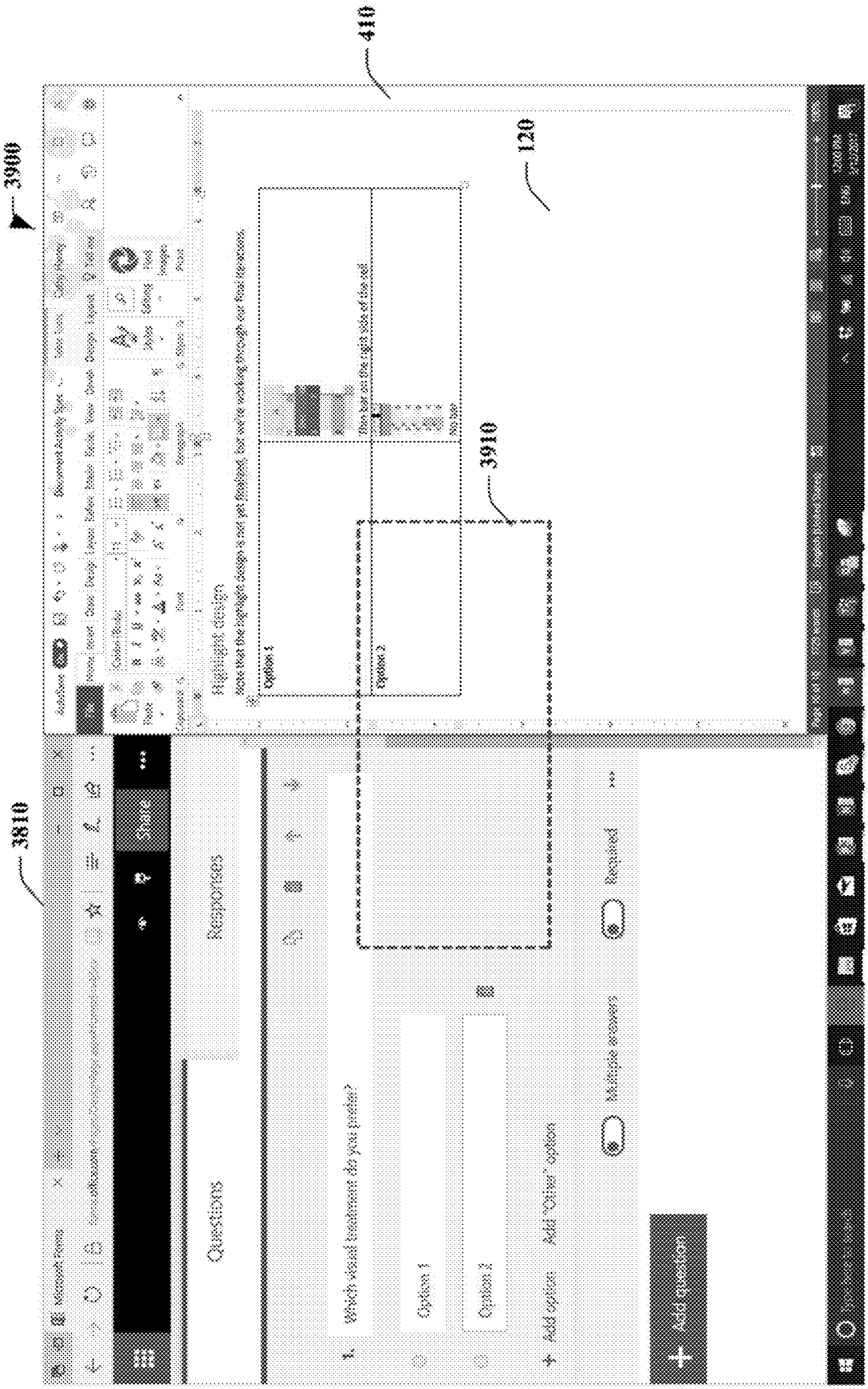

By way of example, and not limitation, FIG. 39 illustrates an exemplary user interface 3900 generated by the application 110 and displayed by the client device 140. In this example, the user 160 has selected to drag a form 3910 from the online form application 3810 into the document 120.

Figure 40:
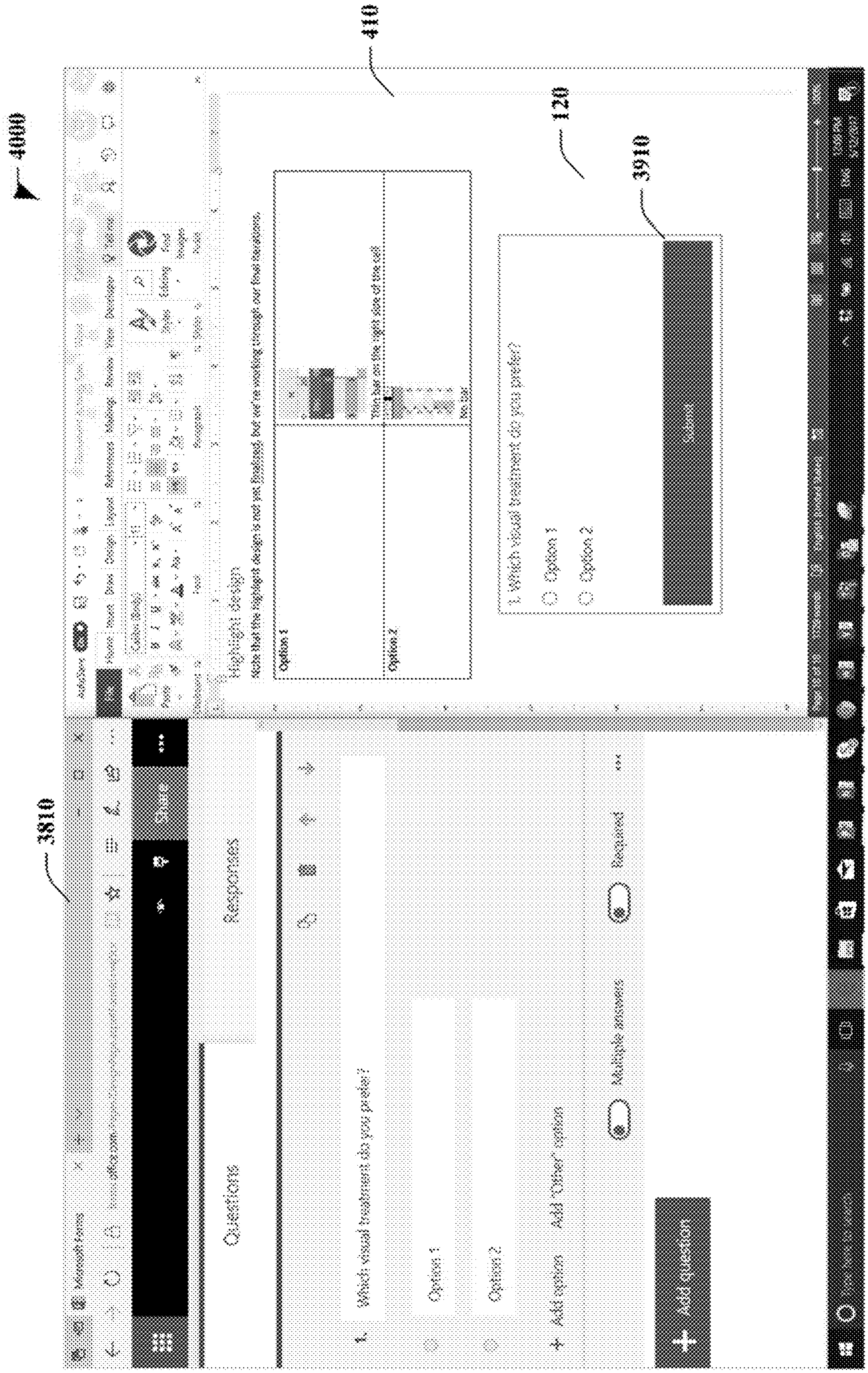

By way of example, and not limitation, FIG. 40 illustrates an exemplary user interface 4000 generated by the application 110 and displayed by the client device 140. In this example, the user 160 has completed dragging of the form 3910 from the online form application 3810 into the document 120. In this example, the displayed form 3910 is a component of an instance of an action card 180 coupled to a service 130 associated with the online form application 3810.

Figure 41:
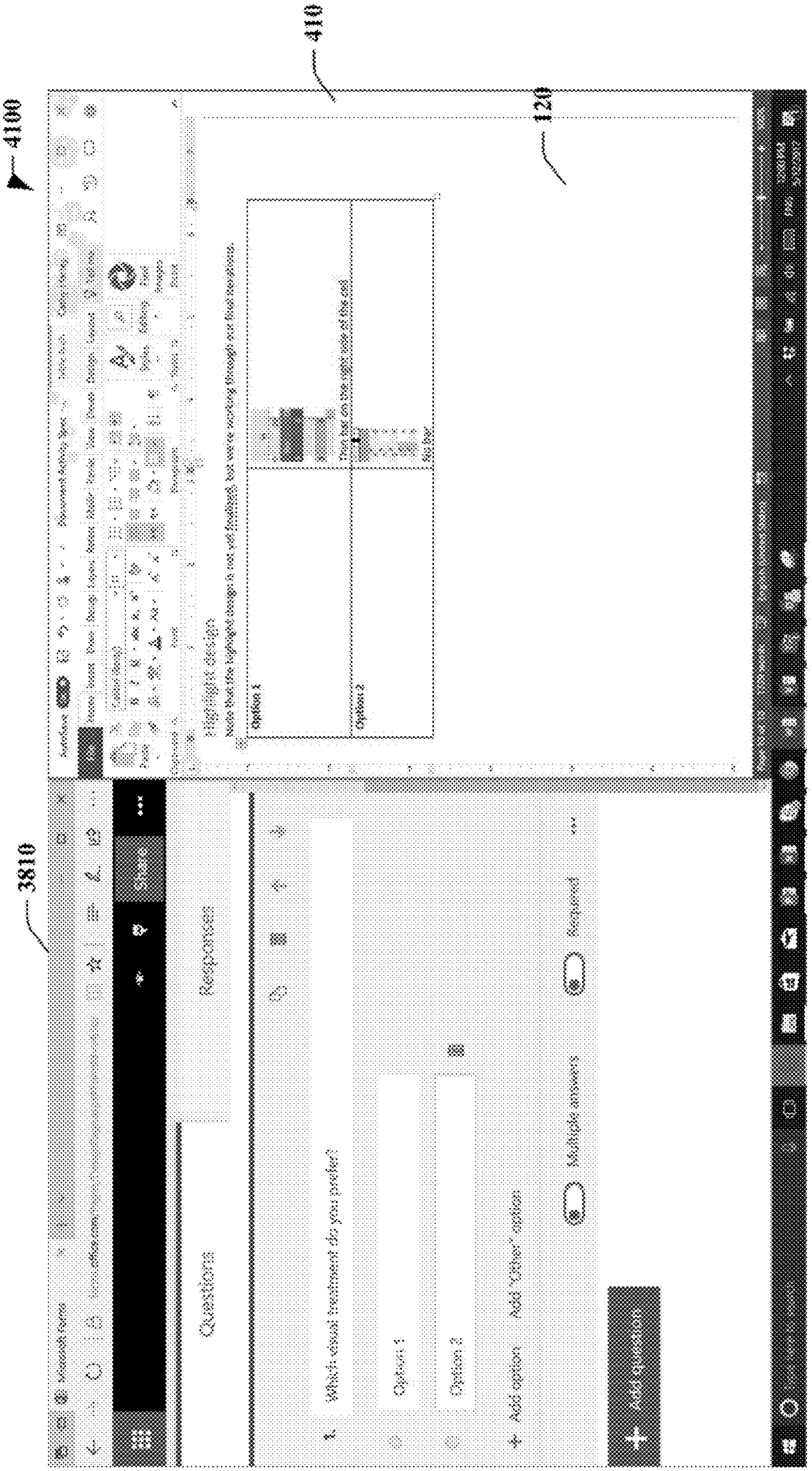

By way of example, and not limitation, FIG. 41 illustrates an exemplary user interface 4100 generated by the application 110 and displayed by the client device 140. In this example, the user 160, is working with the document 120 and with the online form application 3810.

Figure 42:
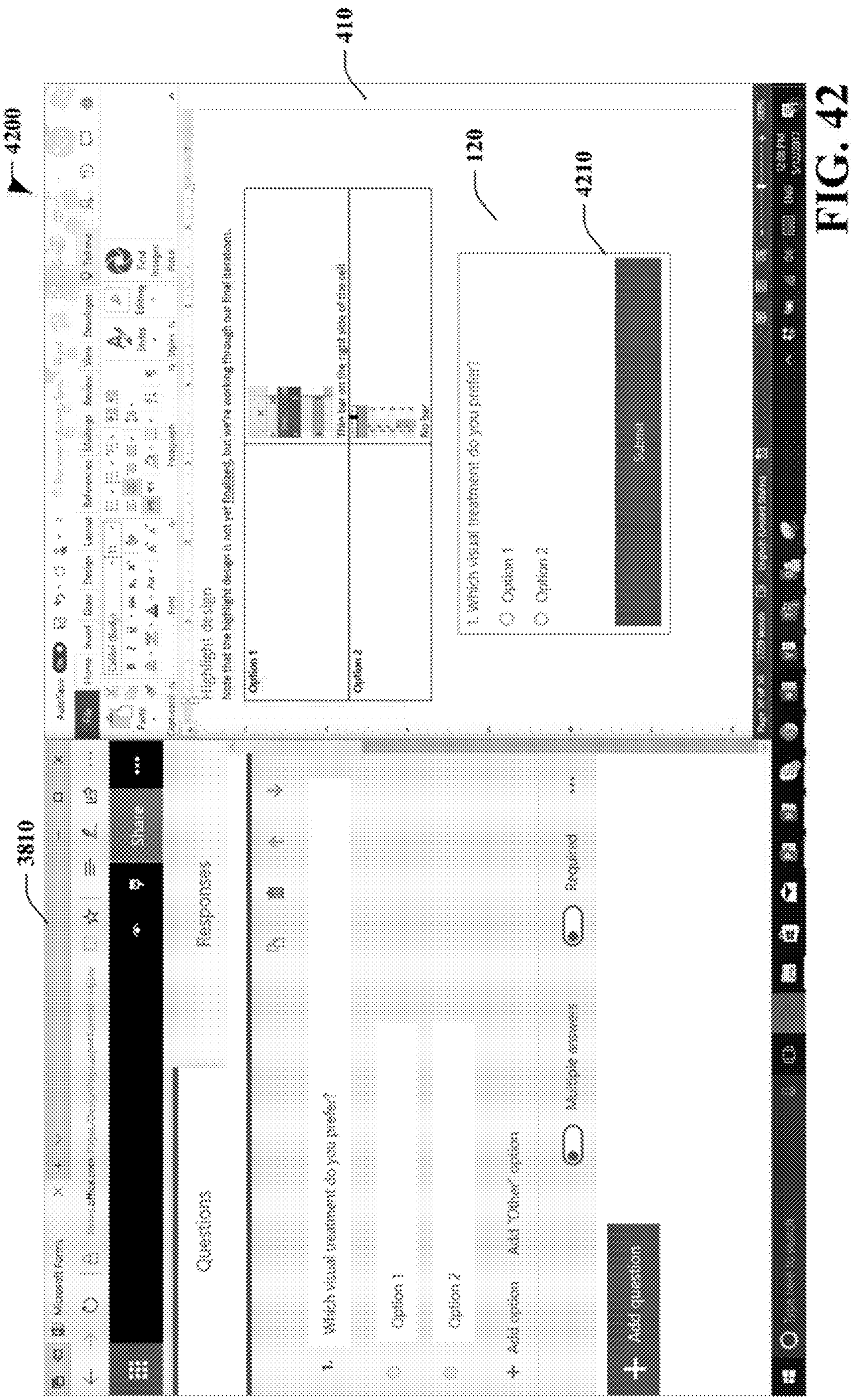

By way of example, and not limitation, FIG. 42 illustrates an exemplary user interface 4200 generated by the application 110 and displayed by the client device 140. In this example, the user 160 can copied a link from questions of the online form application 3810 causing an instance 4210 of an action card 180 coupled to a service 130 associated with the online form application 3810 to be embedded in the document 120.

Figure 43:
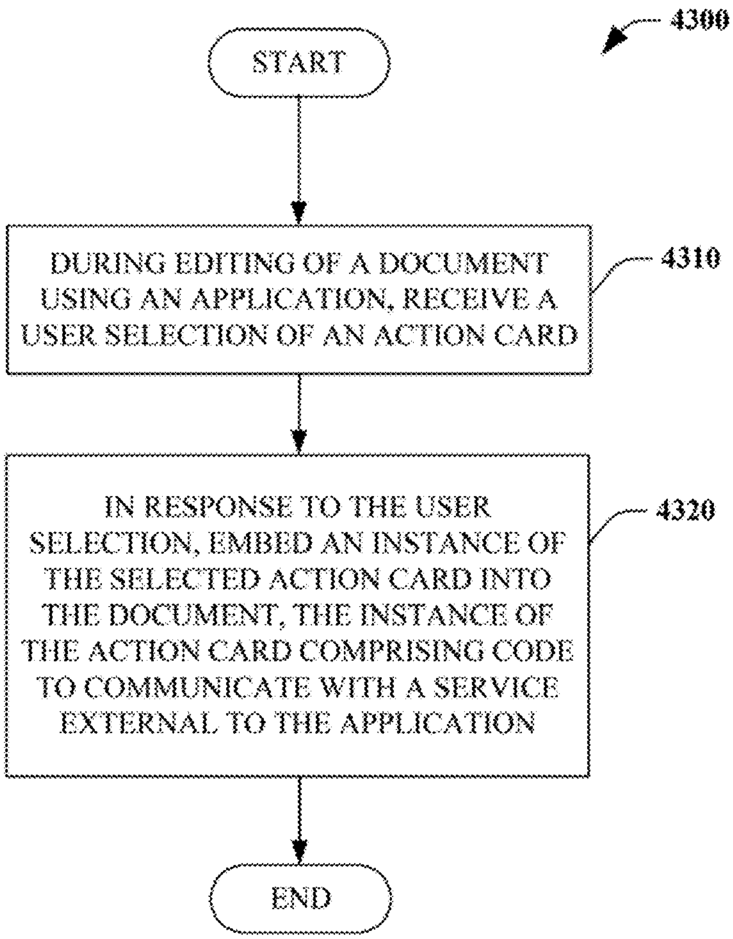
FIG. 43 illustrates an exemplary method of embedding an action card in a document.
Figure 44:
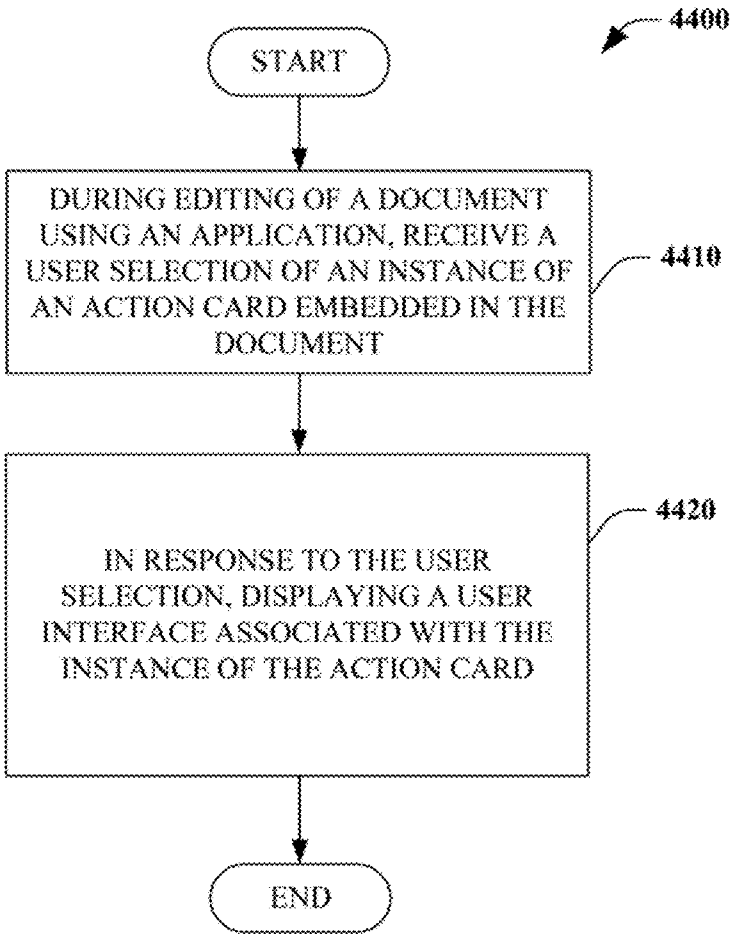
FIG. 44 illustrates an exemplary method of consuming an action card in a document.
Figure 45:
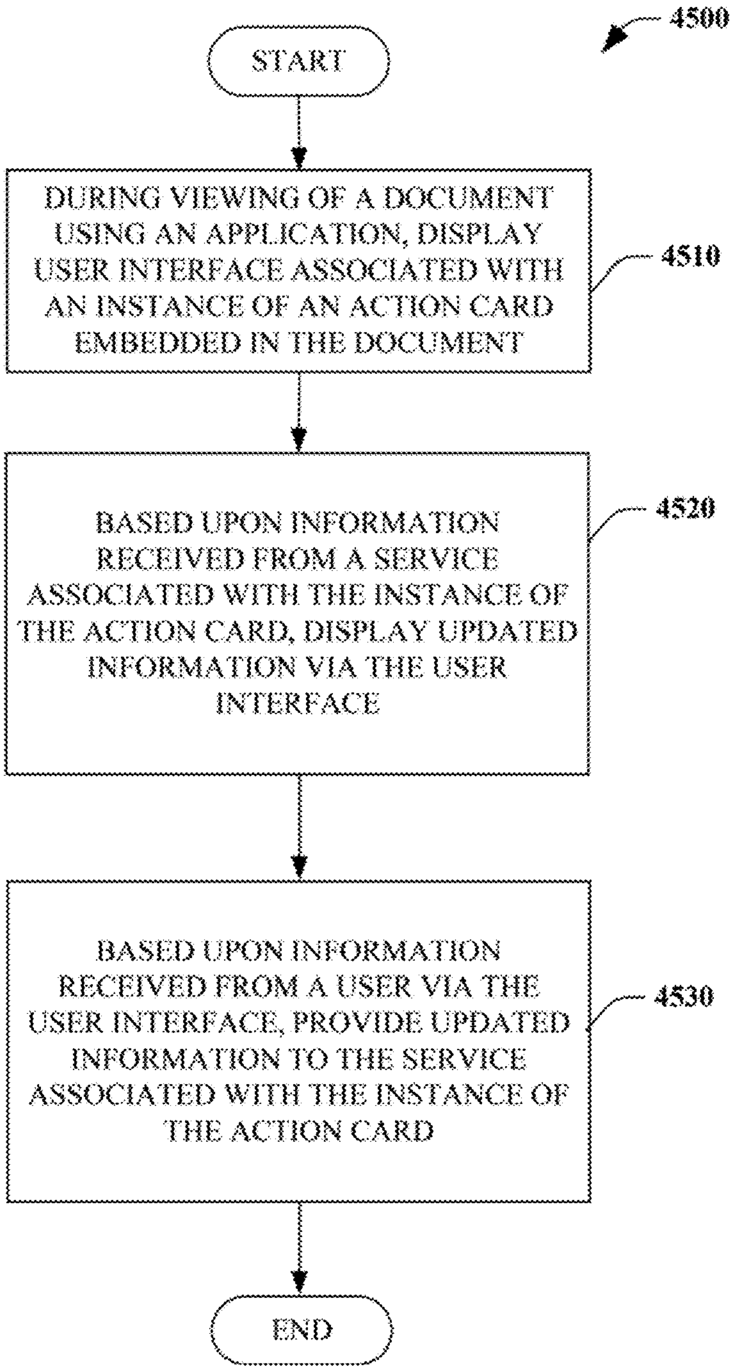
FIG. 45 illustrates an exemplary method of consuming an action card in a document.

FIGS. 43-45 illustrate exemplary methodologies relating embedding and/or consuming action card(s) in document(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 43, a method of embedding an action card in a document 4300 is illustrated. In some embodiments, the method 4300 is performed by the system 100. At 4310, during editing of a document using an application, a user selection of an action card is received. At 4320, in response to the user selection, an instance of the selected action card is embedded into the document. The instance of the action card can comprise code to communicate with a service external to the application.

Turning to FIG. 44, a method of consuming an action card in a document is illustrated. In some embodiments, the method 4400 is performed by the system 100. At 4410, during editing of a document, a user selection of an instance of an action card embedded in the document is received. At 4420, in response to the user selection, a user interface associated with the instance of the action card is displayed.

Next, referring to FIG. 45, a method of consuming an action card in a document is illustrated. In some embodiments, the method 4500 is performed by the system 100. At 4510, during viewing of a document, a user interface associated with an instance of an action card embedded in the document is displayed. At 4520, based upon information received from a service associated with the instance of the action card, updated information is displayed via the user interface. At 4530, based upon information received from a user via the user interface, updated information is provided to the service associated with the instance of the action card.

Described herein is a system for utilizing an action card, comprising: a computer comprising a processor and a memory having computer-executable instructions stored thereupon which, when executed by the processor, cause the computer to: during editing of an electronic document using an application, receive a user selection of an action card; and in response to the user selection, embed an instance of the action card into the electronic document, the instance of the action card comprising code to communicate with a service external to the application. The system can include wherein the service external to the application is accessible to the computer via at least one of the Internet, a wide area network, or a local area network.

The system can further include wherein the service external to the application is local to the computer. The system can include wherein the instance of the action card provides information received from the service external to the application in real-time. The system can further include wherein the application is a word processing application and the electronic document is editable using the word processing application.

The system can include wherein the instance of the action card provides information received from a user of the application to the service external to the application. The system can further include wherein the application is at least one of a word processing application, a spreadsheet application, a database application, a slide presentation application, an electronic mail application, a drawing application, a note taking application, a web browser application, a media player application, or a game application. The system can include the memory having further computer-executable instructions stored thereupon which, when executed by the processor, cause the computing device to: based upon information received from a service associated with the instance of the action card, display updated information via the user interface.

The system can further include the memory having further computer-executable instructions stored thereupon which, when executed by the processor, cause the computing device to: during viewing of the electronic document, receiving a user selection of the instance of the action card embedded in the electronic document; and in response to the user selection, displaying a user interface associated with the instance of the action card.

Described herein is a method of consuming an action card, comprising: during viewing of an electronic document using an application, receiving a user selection of an instance of an action card embedded in the electronic document, the instance of the action card comprising code to communicate with a service external to the application; and in response to the user selection, displaying a user interface associated with the instance of the action card. The method can further include wherein the service external to the application is accessible to a computer hosting the application via at least one of the Internet, a wide area network, or a local area network. The method can include wherein the service external to the application is local to a computer hosting the application.

The method can further include wherein the instance of the action card provides information received from the service external to the application in real-time. The method can include wherein the application is a word processing application and the electronic document is editable using the word processing application. The method can include wherein the instance of the action card provides information received from a user of the application to the service external to the application. The method can further include wherein the application is at least one of a word processing application, a spreadsheet application, a database application, a slide presentation application, an electronic mail application, a drawing application, a note taking application, a web browser application, a media player application, or a game application.

Described herein is a computer storage media storing computer-readable instructions that when executed cause a computing device to: display a user interface associated with an instance of an action card embedded in an electronic document; and based upon information received from a service associated with the instance of the action card, display updated information via the user interface. The computer storage media can include wherein the service is local to a computer hosting an application displaying the user interface associated with the instance of the action card embedded in the electronic document. The computer storage media can store further computer-readable instructions that when executed cause the computing device to: based upon information received from a user via the user interface, provide updated information to the service associated with the instance of the action card. The computer storage media can further include wherein the updated information is provided in real-time.

Figure 46:
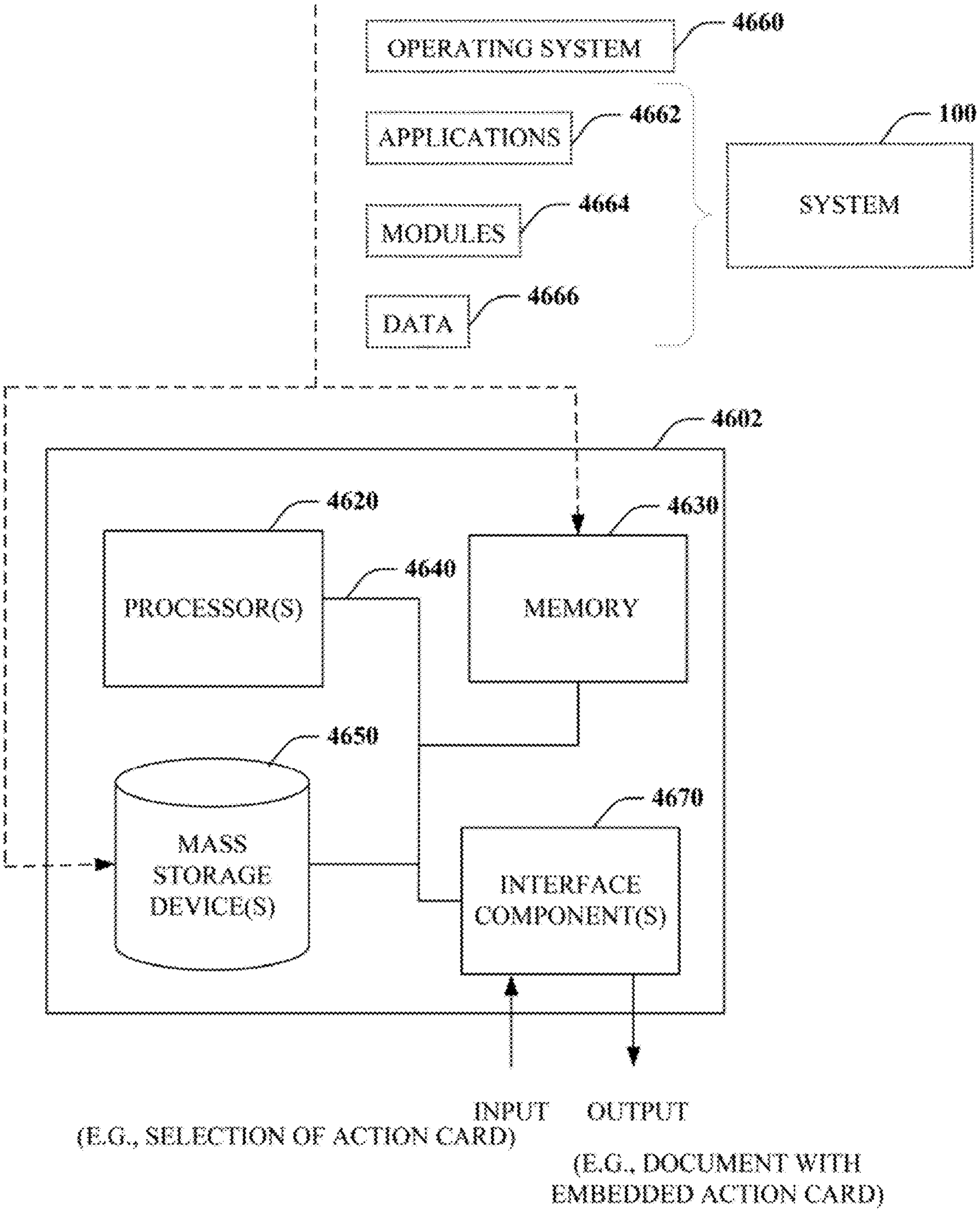
FIG. 46 is a functional block diagram that illustrates an exemplary computing system.

With reference to FIG. 46, illustrated is an example general-purpose computer or computing device 4602 (e.g., mobile phone, desktop, laptop, tablet, watch, server, hand-held, programmable consumer or industrial electronics, set-top box, game system, compute node, etc.). For instance, the computing device 4602 may be used in a system for utilizing an action card in a document 100. For example, the client device 140 may be the computing device 4602.

The computer 4602 includes one or more processor(s) 4620, memory 4630, system bus 4640, mass storage device(s) 4650, and one or more interface components 4670. The system bus 4640 communicatively couples at least the above system constituents. However, it is to be appreciated that in its simplest form the computer 4602 can include one or more processors 4620 coupled to memory 4630 that execute various computer executable actions, instructions, and or components stored in memory 4630. The instructions may be, for instance, instructions for implementing functionality described as being carried out by one or more components discussed above or instructions for implementing one or more of the methods described above.

The processor(s) 4620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 4620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 4620 can be a graphics processor.

The computer 4602 can include or otherwise interact with a variety of computer-readable media to facilitate control of the computer 4602 to implement one or more aspects of the claimed subject matter. The computer-readable media can be any available media that can be accessed by the computer 4602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 4602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 4630 and mass storage device(s) 4650 are examples of computer-readable storage media. Depending on the exact configuration and type of computing device, memory 4630 may be volatile (e.g., RAM), non-volatile (e.g., ROM, flash memory, etc.) or some combination of the two. By way of example, the basic input/output system (BIOS), including basic routines to transfer information between elements within the computer 4602, such as during start-up, can be stored in nonvolatile memory, while volatile memory can act as external cache memory to facilitate processing by the processor(s) 4620, among other things.

Mass storage device(s) 4650 includes removable/non-removable, volatile/non-volatile computer storage media for storage of large amounts of data relative to the memory 4630. For example, mass storage device(s) 4650 includes, but is not limited to, one or more devices such as a magnetic or optical disk drive, floppy disk drive, flash memory, solid-state drive, or memory stick.

Memory 4630 and mass storage device(s) 4650 can include, or have stored therein, operating system 4660, one or more applications 4662, one or more program modules 4664, and data 4666. The operating system 4660 acts to control and allocate resources of the computer 4602. Applications 4662 include one or both of system and application software and can exploit management of resources by the operating system 4660 through program modules 4664 and data 4666 stored in memory 4630 and/or mass storage device (s) 4650 to perform one or more actions. Accordingly, applications 4662 can turn a general-purpose computer 4602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 4662, and include one or more modules 4664 and data 4666 stored in memory and/or mass storage device(s) 4650 whose functionality can be realized when executed by one or more processor(s) 4620.

In accordance with one particular embodiment, the processor(s) 4620 can correspond to a system on a chip (SOC) or like architecture including, or in other words integrating, both hardware and software on a single integrated circuit substrate. Here, the processor(s) 4620 can include one or more processors as well as memory at least similar to processor(s) 4620 and memory 4630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 4602 also includes one or more interface components 4670 that are communicatively coupled to the system bus 4640 and facilitate interaction with the computer 4602. By way of example, the interface component 4670 can be a port (e.g., serial, parallel, PCMCIA, USB, FireWire, etc.) or an interface card (e.g., sound, video, etc.) or the like. In one example implementation, the interface component 4670 can be embodied as a user input/output interface to enable a user to enter commands and information into the computer 4602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 4670 can be embodied as an output peripheral interface to supply output to displays (e.g., LCD, LED, plasma, etc.), speakers, printers, and/or other computers, among other things. Still further yet, the interface component 4670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:

a processor; and a memory having computer-executable instructions stored thereupon which, when executed by the processor, cause the system to:

during editing, using a word processing application, of an electronic document having a document canvas:

receive a predefined command comprising a character, symbol, or sequence of characters entered to the word processing application;

identify content of the electronic document other than the predefined command;

based at least on the content of the electronic document other than the predefined command, identify at least two different suggested graphical action cards configured to provide user input to different network-accessible remote services;

in response to receipt of the predefined command, display a service display area on the document canvas, the service display area identifying the at least two different suggested graphical action cards;

receive another character, symbol, or sequence of characters entered to the word processing application after the predefined command;

in response to receipt of the another character, symbol, or sequence of characters, modify the service display area by substituting another suggested graphical action card for one of the at least two different suggested graphical action cards;

receive a user selection of a particular graphical action card from the service display area displayed on the document canvas of the electronic document; and in response to the user selection, embed an instance of the particular graphical action card into the document canvas of the electronic document, the instance of the particular graphical action card comprising code configured to receive particular user input and communicate the particular user input to a particular network-accessible remote service.

2. The system of claim 1, wherein the another character, symbol, or sequence of characters is entered to the word processing application immediately after the predefined command.

3. The system of claim 1, wherein the instance of the particular graphical action card is configured to display information received from the particular network-accessible remote service in real-time.

4. The system of claim 1, wherein the instance of the particular graphical action card provides information received from a user of the word processing application to the particular network-accessible remote service.

5. The system of claim 1, the memory having further computer-executable instructions stored thereupon which, when executed by the processor, cause the system to:

based at least upon information received from the particular network-accessible remote service, display updated information via a user interface of the word processing application.

6. The system of claim 1, the particular graphical action card comprising multiple user-selectable radio buttons.

7. The system of claim 1, wherein the another suggested graphical action card has a name beginning with the another character, symbol, or sequence of characters.

8. The system of claim 7, wherein the particular graphical action card that is selected is the another suggested graphical action card.

9. A method, comprising:

during editing of an electronic document using a productivity application:

receiving a predefined command comprising a character, symbol, or sequence of characters entered to the electronic document;

identifying content of the electronic document other than the predefined command;

based at least on the content of the electronic document other than the predefined command, identifying at least two different suggested graphical action cards having corresponding code configured to provide user input to different network-accessible remote services;

in response to receipt of the predefined command, displaying a service display area on a document canvas of the electronic document, the service display area identifying the at least two different suggested graphical action cards;

receiving a user selection of a particular graphical action card from the service display area displayed on the document canvas of the productivity application; and in response to the user selection, embedding an instance of the particular graphical action card into the electronic document, the instance of the particular graphical action card comprising particular code configured to communicate with a particular network-accessible remote service external to the productivity application; and during viewing of the electronic document:

receiving another user selection of the instance of the particular graphical action card embedded in the electronic document; and in response to the another user selection, displaying a user interface associated with the instance of the particular graphical action card.

10. The method of claim 9, wherein the particular network-accessible remote service external to the productivity application is accessible to a computer hosting the productivity application via at least one of the Internet, a wide area network, or a local area network.

11. The method of claim 9, wherein the particular network-accessible remote service extern provides payment functionality to facilitate payment of invoices.

12. The method of claim 9, wherein the instance of the particular graphical action card provides information received from a user of the productivity application to the particular network-accessible remote service external to the productivity application.

13. The method of claim 9, further comprising:

based at least upon information received from the particular network-accessible remote service, displaying updated information via the productivity application.

14. The method of claim 9, wherein the editing and the viewing occur on different computing devices.

15. A computer storage media storing computer-readable instructions that, when executed, cause a computing device to:

receive a predefined command comprising a character, symbol, or sequence of characters added inline as content to an electronic document using a particular application;

identify content of the electronic document other than the predefined command;

based at least on the content of the electronic document other than the predefined command, identify at least two different graphical action cards;

in response to receipt of the predefined command, display a service display area identifying the at least two different graphical action cards, the at least two different graphical action cards having corresponding code that can be embedded into the electronic document;

receive a user selection of a first graphical action card from the service display area;

in response to the user selection, embed an instance of the first graphical action card into the electronic document, the instance of the first graphical action card comprising first code configured to communicate with a first service external to the particular application; and send a link to a remote computing device, the link being configured to open the electronic document on the remote computing device with the first graphical action card embedded therein, wherein the link is configured to cause the electronic document to automatically navigate to the first graphical action card when opened on the remote computing device.

16. The computer storage media of claim 15, wherein the first service is local to the computing device executing the particular application.

17. The computer storage media of claim 15, wherein the first service is external to the particular application and is local to the computing device executing the particular application.

18. The computer storage media of claim 15, wherein the instance of the first graphical action card provides information received from the first service external to the particular application in real-time.

19. The computer storage media of claim 15 storing further computer-readable instructions that, when executed, cause the computing device to:

based at least upon information received from the first service, display updated information via a user interface of the particular application.

20. The computer storage media of claim 15, wherein the link is selectable via user input on the remote computing device.

* * * * *